US007767010B2

(12) United States Patent
Curzon et al.

(10) Patent No.: US 7,767,010 B2
(45) Date of Patent: Aug. 3, 2010

(54) FLAME RETARDANT AND MICROBE INHIBITING METHODS AND COMPOSITIONS

(75) Inventors: Jon Lee Curzon, Atlanta, GA (US); Thomas William Smoot, Alpharetta, GA (US)

(73) Assignee: SMT, Inc., Atlanta, GA (US)

( * ) Notice: Subject to any disclaimer, the term of this patent is extended or adjusted under 35 U.S.C. 154(b) by 1877 days.

(21) Appl. No.: 10/805,089

(22) Filed: Mar. 19, 2004

(65) Prior Publication Data
US 2004/0173783 A1   Sep. 9, 2004

Related U.S. Application Data

(63) Continuation-in-part of application No. 10/408,072, filed on Apr. 4, 2003, now abandoned, which is a continuation-in-part of application No. 10/176,411, filed on Jun. 19, 2002, now abandoned.

(60) Provisional application No. 60/348,543, filed on Jan. 16, 2002.

(51) Int. Cl.
C09D 5/14        (2006.01)
C09D 5/18        (2006.01)

(52) U.S. Cl. .............. 106/15.05; 106/18.11; 106/18.13; 106/18.14; 106/18.26; 106/18.3; 106/18.31; 252/601

(58) Field of Classification Search .............. 106/15.05, 106/18.11, 18.13–18.21, 18.26, 18.3–18.33, 106/18; 252/601
See application file for complete search history.

(56) References Cited

U.S. PATENT DOCUMENTS

| | | | |
|---|---|---|---|
| 1,339,488 A | 5/1920 | Weiss et al. | |
| 2,432,963 A | 12/1947 | Camp | |
| 3,877,979 A | 4/1975 | Clark | 427/337 |
| 3,998,944 A | 12/1976 | Long | 424/413 |
| 4,116,931 A | 9/1978 | Minhas et al. | 260/45.75 |
| 4,234,340 A | 11/1980 | Pellico | 106/15.05 |
| 4,278,468 A | 7/1981 | Selbe et al. | 106/774 |
| 4,302,345 A | 11/1981 | McCarter | 252/62 |
| 4,303,726 A | 12/1981 | Turner | 427/297 |
| 4,323,565 A | 4/1982 | Hasegawa et al. | 424/246 |
| 4,439,566 A | 3/1984 | Thomas | 524/108 |
| 4,461,721 A | 7/1984 | Goettsche et al. | 252/607 |
| 4,610,881 A | 9/1986 | Bechgaard | 424/148 |
| 4,647,486 A | 3/1987 | Ali | 428/70 |
| 4,725,382 A | 2/1988 | Lewchalermwong | 252/607 |
| 4,756,839 A * | 7/1988 | Curzon et al. | 252/2 |
| 4,816,186 A | 3/1989 | Acitelli | 252/610 |
| 4,935,232 A | 6/1990 | McIntosh | 424/78 |
| 4,961,865 A | 10/1990 | Pennartz | 252/7 |
| 5,399,190 A | 3/1995 | Conradie et al. | 106/18 |
| 5,518,774 A | 5/1996 | Kappock et al. | 427/384 |
| 5,562,995 A | 10/1996 | Kappock | 428/469 |
| 5,612,094 A | 3/1997 | Schubert et al. | 427/397 |
| 5,883,154 A | 3/1999 | Kappock et al. | 523/122 |
| 5,939,203 A | 8/1999 | Kappock et al. | 428/469 |
| 6,010,596 A | 1/2000 | Song | 162/158 |
| 6,096,122 A | 8/2000 | Kappock et al. | 106/18.36 |
| 6,231,650 B1 | 5/2001 | Mallow et al. | 106/15.05 |
| 6,280,509 B1 | 8/2001 | Mallow et al. | 106/15.05 |
| 6,333,399 B1 | 12/2001 | Teslenko et al. | 536/20 |
| 6,335,308 B1 | 1/2002 | Kitten | 504/101 |
| 6,342,284 B1 | 1/2002 | Yu et al. | 428/70 |
| 6,387,172 B1 | 5/2002 | Yu et al. | 106/680 |
| 6,680,127 B2 | 1/2004 | Capps | 428/537.7 |
| 6,699,426 B1 | 3/2004 | Burke | 264/426 |
| 6,893,752 B2 | 5/2005 | Veeramasuneni et al. | 428/723 |
| 7,211,293 B2 * | 5/2007 | Piana et al. | 427/240 |
| 2003/0017565 A1 | 1/2003 | Echigo et al. | 435/189 |
| 2003/0031898 A1 | 2/2003 | Capps | 428/703 |
| 2003/0035981 A1 | 2/2003 | Capps | 428/703 |

(Continued)

FOREIGN PATENT DOCUMENTS

CN           1223290 A       7/1999

(Continued)

OTHER PUBLICATIONS

U.S. Appl. No. 10/176,411, filed Jun. 19, 2002, Curzon et al.

(Continued)

*Primary Examiner*—William Phillip Fletcher, III
(74) *Attorney, Agent, or Firm*—Roberta L. Hastreiter; Locke, Lord, Bissell & Liddell LLP

(57) ABSTRACT

The present invention provides compositions for application to a material, such as building materials, prior to an exposure of the material to fire, or prior to, during or after exposure of the material to conditions favorable to the growth of microbes. When compositions within the present invention are properly applied to a material, they have the effect of reducing the amount of burning that occurs to the material, and/or reducing the amount or density of smoke and associated toxic gases produced by the material, when the material is exposed to fire, and inhibiting the growth of microbes on the material when the material is exposed to conditions favorable to the growth of microbes. The invention also provides methods for reducing the burning of a material that is exposed to fire, and for inhibiting the growth of microbes on a material exposed to conditions favorable to the growth of microbes.

37 Claims, No Drawings

U.S. PATENT DOCUMENTS

| | | | |
|---|---|---|---|
| 2003/0037502 A1 | 2/2003 | Bruce et al. | 52/517 |
| 2003/0170317 A1 | 9/2003 | Curzon et al. | |
| 2003/0234068 A1 | 12/2003 | Swofford et al. | 156/39 |
| 2004/0005484 A1 | 1/2004 | Veeramasuneni et al. | 428/703 |

FOREIGN PATENT DOCUMENTS

| | | |
|---|---|---|
| DE | 3010375 | 3/1982 |
| DE | 41 08 341 A1 * | 9/1992 |
| DE | 41 08341 A1 | 9/1992 |
| DE | 41 20993 A1 | 12/1992 |
| DE | 4339078 A1 | 5/1995 |
| EP | 0 285 721 A1 | 10/1988 |
| EP | 344771 A1 | 12/1989 |
| EP | 0 434 391 | 6/1991 |
| EP | 0 636 461 A1 | 1/1995 |
| GB | 1 306 740 | 2/1973 |
| GB | 2354771 A1 | 4/2001 |
| JP | 88317302 A2 | 12/1988 |
| JP | 02180462 | 3/1992 |
| JP | 6025980 A2 | 2/1994 |
| JP | 107861 A2 | 1/1998 |
| JP | 10025479 A2 | 1/1998 |
| JP | 9836610 A2 | 2/1998 |
| JP | 2000063564 A2 | 2/2000 |
| JP | 2000108108 A2 | 4/2000 |
| JP | 2000290827 | 10/2000 |
| JP | 3122818 B1 | 1/2001 |
| JP | 2001-131409 | 12/2001 |
| JP | 2002226828 A2 | 8/2002 |
| JP | 2002294205 A2 | 10/2002 |
| RO | 87738 B1 | 10/1985 |
| RU | 2071491 | 1/1997 |
| RU | 2091417 | 9/1997 |
| RU | 2147028 C1 | 3/2000 |
| RU | 2149148 | 5/2000 |
| RU | 2178029 C1 | 1/2002 |
| WO | WO 97/14303 | 4/1997 |
| WO | WO 00/00570 | 1/2000 |
| WO | WO 00/07804 A1 | 2/2000 |
| WO | WO 02/06021 A2 | 1/2002 |

OTHER PUBLICATIONS

U.S. Appl. No. 60/348,543, filed Jan. 16, 2002, Curzon et al.
James F. O'Bryon, "Think Globally, Act Globally," Halon Options Technical Working Conference, Apr. 27-29, 1999.
J. Berezovsky et al., "Pyrogen Fire Suppression Grenades," Halon Options Technical Working Conference, 480-487, Apr. 27-29, 1999.
Bradley A. Williams et al., "Suppression Mechanisms of Alkali Metal Compounds," Halon Options Technical Working Conference, 157-166, Apr. 27-29, 1999.
Jennifer Fogel et al., "Mold Performance of some Construction Products with and without Borates," Forest Prod. J. 52(2):38-43 (2002).
Bradley A. Williams et al., "Suppression Mechanisms of Alkali Metal Compounds," U.S. Naval Research Laboratory, Halon Options Technical Working Conference, pp. 157-166 (Apr. 27-29, 1999).
Berezovsky et al., "Pyrogen Fire Suppression Grenades," AES International, Huntsville, Australia, Halon Options Technical Working Conference, pp. 481-487 (Apr. 27-29, 1999).
G. G. Back et al., "Full Scale Evaluation of the Water Mist Additive QUAD-EX," Naval Research Laboratories, Halon Options Technical Working Conference (1999).
Alistagen, Excerpt from web site http://www.alistagen.com/products_body.htm entitled "Description of Product" (2002).
Kumar, Excerpt from web site mnyrkumar@mailcity.com entitled "Chitin and Chitosan for Versatile Applications Homepage."
Interface, Inc., Intercept®, A Fungistat and Bacteriostat for Incorporation into Various Products, Jan. 30, 2002.
United States Gypsum Company, Material Safety Data Sheet, Sheetrock® Brand Humitek™ Gypsum Panels Firecode® Core, Type X, Oct. 9, 2003.
Troy Chemical Corp., Material Safety Data Sheet, Polyphase P100 (2001).
U.S. Borax, Brochure entitled "Borax Products and their Applications," U.S. Borax (2002).
Alejandro Ferrando et al., "Regulation of Cation Transport in *Saccharomyces cervisiae* by the Salt Tolerance Gene HAL3," Molecular and Cell Biology, vol. 15, No. 10, 5470-5481 (1995).
Shiladitya DasSarma et al., "Halophiles," Encyclopedia of Life Sciences, 1-9, Nature Publishing Group (2001).
McGraw-Hill, McGraw-Hill, Encyclopedia of Science & Technology, $8^{th}$ ed., vol. 10, pp. 78-79 (1997).
McGraw-Hill, McGraw-Hill, Encyclopedia of Science & Technology, $8^{th}$ ed., vol. 13, p. 345 (1997).
McGraw-Hill, McGraw-Hill, Encyclopedia of Science & Technology, $8^{th}$ ed., vol. 3, pp. 430-431 and 437-438 (1997).
McGraw-Hill, McGraw-Hill, Encyclopedia of Science & Technology, $8^{th}$ ed., vol. 8, pp. 434-435 (1997).
McGraw-Hill, McGraw-Hill, Encyclopedia of Science & Technology, $8^{th}$ ed., vol. 7, p. 554 (1997).
NG Magill et al., "The Internal pH of the Forespore Compartment of *Bacillus megaterium* Decreases by about 1 pH Unit During Sporulation," J. Bacteriol. vol. 176, No. 8, 2252-2258 (1994).
GP Ferguson et al., "Survival During Exposure to the Electrophilic Reagent N-Ethylmaleimide in *Escherichia coli*: Role of KefB and KefC Potassium Channels," J. Bacteriol, vol. 179, No. 4, 1007-1012 (1997).
Cynthia Stewart et al., "*Staphylococcus aureus* Growth Boundaries: Moving Towards Mechanistic Predictive Models Based on Solute-Specific Effects," Appl. Envir. Microbial. 68: 1864-1871 (2002).
A. Lopez-Malo et al., "*Aspergillus flavus* Dose-Response Curves to Selected Natural and Synthetic Antimicrobials," Int. J. Food Microbiol 73(2-3):213-8 (2002).
DL Parker et al., "Potassium Salts Inhibit Growth of the Cyanobacteria *Microcystis* spp. in Pond Water and Defined Media: Implications for Control of Microcystin-Producing Aquatic Blooms," Appl. Environ. Microbiol. vol. 63, No. 6, 2324-2329 (1997).
Carlos A. Stella et al., "Effect of Potassium on *Saccharomyces cerevisiae* Resistance to Fluconazole," Antimicrob. Agents Chemother. vol. 45, No. 5, 1589-1590 (2001).
Th. H. Daniels et al., "Combustion Characteristics of Zinc Borate—Impregnated OSB Wood Waste in the Atmospheric Fluidized Bed," *Proceedings of the 1998 $32^{nd}$ International Particleboard/Composite Materials Symposium*, Pullman, WA, Mar. 31-Apr. 2, 1998, EI Conference No. 49403.
"Recent Progress in Topochemistry of Wood/Inorganic Composites as Prepared by the Sol/Gel Process," Proc. PRA 'Organic/Inorganic Hybrids' Conf., Guildford 2000, Paper 27, 19, pp. 2000.
Buckman Laboratories Inc., "Non-Toxic Corrosion Resistant Pigment," Notiziario 1977, No. 276, 1-3, RAPRA Abs 1978, vol. 15, No. 3, Abs. 7711090L 1977.
M. Jensen et al., "Responses in Plant, Soil Inorganic and Microbial Nutrient Pools to Experimental Fire, Ash and Biomass Addition in a Woodland Savanna," Oecologia, 2001, V128, N1 (JUN), 85-93 (2001).
Kyoto Univ., "Preservative Properties of Vapor Boron Treated Wood and Wood Based Compositions," J. Wood Sci., vol. 47, No. 2, 149-153 (2001).
Taika Zairyo, Taika Zairyo (Krosaki Technical Report, a Japanese publication), No. 146, 12-18 (1998).
Yamaguchi Haruhiko, "Complexes of Silicic Acid Polymer-Inorganic Compounds as Wood Preserving Agents," Mokuzai Hozon (Wood Preservation) vol. 22, No. 5, 254-261 (1996).
Ishihara Shigehisa, "Boron and its Compounds as Wood Fire Retardants," Mokuzai Hozon (Wood Preservation) vol. 15, No. 6, 248-260 (1989).
Hagio Katsuhiko et al., "Durable Fire Retardant Treatment of Wood and Wood-Based Materials, Fire Retardant Treatment of Plywood, Doubling as Preservative Treatment," Mokuzai Hozon (Wood Preservation) vol. 14, No. 1, 8-17 (1988).
M. K. Yalinkilic et al., "Boron Effect on Decay Resistance of some Fire Retardant Coatings Applied on Plywood Surface," Holz als Roh- und Werkstoff, 56 (5), 347-353 (1998).

P. E. Laks et al., "Anti-sapstain efficacy of Borates against *Aureobasidium* Pollutants," Forest Products Journal, 43 (1), 33-34 (1993).

J. D. Bakker., "Busan 11-M1 in the Formulation of Anticorrosive, Antimicrobial and Fireproof Paints," Colores Pinturas vol. 20, No. 144, 5-17 (1971).

D. D. Sahgal et al., "Microbial Degradation of Materials and Equipment in Tropical Climate and its Control," Labdev, vol. 5, No. 3, 175-81 (1967).

M. Petric et al., "Efficiency of some Boron Containing Wood Preservatives," Wood in the Construction Industry, International Conference, Zagreb, Croatia, Apr. 26, 2000.

J. George, Boron Based Preservatives for Wood and Wood Products, Wood News, vol. 9 (4), 21-22 (2000).

G. Dallemagne, Societe Nationale Industrielle Aerospatiale, Les Mureaux, France, Report No. SNIAS-821-551-105, DCQ/L-160. 390/82, 14 pages (1982).

T. Ehrenfreund-Kleinman et al., "Synthesis and Characterization of Novel Water Soluble Amphotericin B-Ararinogalactan Conjugates," Biomaterials, V23, N5, 1327-1335 (2002).

T. Maeseto, "Fabrication and Antibacterial Activity of Antibacterial Glass Linings by Ion Exchange Method," Nippon Seramikkusu Kyokai Gakujutsu Ronbunshi, 109(5), 477-479 (2001).

R. E. Sherburn, "Amine Borate Catabolism by Bacteria Isolated from Contaminated Metal-Working Fluids," Journal of Applied Microbiology, 87 (5), 668-675 (1999).

Kelvin K. Shen, "Flame Retardency Advances in Fire Safety," U.S. Borax Research Corp., USA, Conference held at Pine Mountain, Georgia, USA, on Mar. 28, 1984, E.I. Conference No. 07153.

Okada Kazuhisa, Presentations at the $3^{rd}$ JWPA Annual Meeting, Mokuzai Hozon (Wood Preservation) vol. 23, No. 3, 133-135 (1997).

M. W. Scheoman et al., "The Role of Boron-Based Additives in Exterior Wood Coatings," Surf. Coat. Int., vol. 82, No. 3, 124-126 (1999).

Francisco P. Clemente, "New Possibilities for the Manufacture of Fire Resistant Paper and Paper with Microorganism-Inhibiting Properties," Invest. Tec. Pap., vol. 13, No. 48, 437-44 (1976).

M. A. Kasem, "Flame-Retardants for Fabrics: Function of Boron-Containing Additives," Industrial and Engineering Chemistry Product Research and Development, V11, N2, 114-133 (1972).

W-Y Su et al., "Combustion Behavior of Boron-Alkali Metal Treated Wood Using Thermographic Analysis," Mokuzai Gakkaishi (Journal of the Japan Wood Research Society), vol. 43, No. 1, 82-89 (1997).

Hata Toshimitsu et al., "Mechamism Evaluation and Development of Suppression of Wood Combustion by Boric Compounds," Wood Res. Inst., Kyoto Univ. Mokuzai Hozon (Wood Preservation), vol. 21, No. 6, 299-305 (1995).

Baoshu Yao et al., "Preparation of and Flame Retardance of Some Antimonides," Huaxue Shijie, vol. 25, No. 11, 410-414 (1984).

P. G. Gordon et al., "Investigations into the Mechanisms of Flame Retardation on Wool," Text Res. J., vol. 47, No. 11, 699-711 (1977).

Jeffrey W. Gilman, "Char Enhancing Approaches to Flame Retarding Polymers," National Institute of Standards and Technology, Addit. '98, Int. Conf. Exhib, $7^{th}$, 2/1-1/13, Gaithersburg, MD, USA (1998).

Tara Williams-Hart et al., "Protein Phosphatase Type I Regulates Ion Homeostasis in *Saccharomyces cerevisiae*," Genetics 160: 1423-1437 (2002).

Stephan J. A. Hesse et al., "Intracellular pH Homeostasis in the Filamentous Fungus *Aspergillus niger*," Eur. J. Biochem. 269, 3485-3493 (2002).

N. Beales, "Adaptation of Microorganisms to Cold Temperatures, Weak Acid Preservatives, Low pH, and Osmotic Stress: A Review," Comprehensive Reviews in Food Science and Food Safety, vol. 3, 1-20 (2004).

The Gale Group, "Short Fibers Shorten Burn," Flame Retardancy, Supplier No. 72519327, News, V11, N3, pNA (2001).

The Gale Group, Trade Name Directory, Supplier No. 72121921, Modern Plastics, p. F-229 (Feb. 15, 2001).

The Gale Group, "Team Explores Expansion of Borate," Supplier No. 59678686, Flame Retardancy News, V10, N2, pNA (Feb. 2000).

The Gale Group, Newswire, Supplier No. 56177653, Nippon Chemical Industrial Co., Comline Chemicals & Materials, p. 991008100029, Oct. 8, 1999.

The Gale Group, "Mineral Fillers for Plastics and Elastomers," Supplier No. 50275161, Innovator's Digest, v98, n18, pN/A Sep. 1, 1998.

The Gale Group, "Inorganic Based FRs: Mixed Additives for Thermoplastic," Supplier No. 44642846, Flame Retardancy News v4, n5, pN/A, May 1994.

The Gale Group, "Experimental Use Permits Granted by EPA Noted," Supplier No. 43358908, Pesticide & Toxic Chemical News, v20, n49, pN/A Oct. 7, 1992.

The Gale Group, "Properties and Applications of a New Anti-Corrosion Pigment," Supplier No. 42839578, European Polymers Paint Colour Journal, p. 154, Mar. 18, 1992.

The Gale Group, "Japanese Continue to Develop New FR Epoxy Molding Compounds," Supplier No. 41837789, Flame Retardancy News, v1, n2, pN/A Feb. 1991.

The Gale Group, "Cocoon Insulation," Advertisement, Supplier No. 97403841, Professional Builder (1993), 68, 1, 134(2), Feb. 2002.

The Gale Group, "B Mail" (Letter to the Editor), Supplier No. 90655099, Builder, 25, 9, 24(1), Aug. 2002.

The Gale Group, "The House that LP Built" (Special Advertising Supplement), Supplier No. 83056397, Professional Builder (1993), 67, 2, 52(30), Feb. 2002.

David M. Schubert, "Multifunctional Zinc Borate-Based Anticorrosive Pigment," Supplier No. 12913585, Modern Paint and Coatings, v82, n8, p. 43(4), Aug. 1992.

The Gale Group, "Antifungal Agents" (Continuing Education), Supplier No. 09298851, Drug Store News, v12, n14, p. IP19(4), Jul. 23, 1990.

The Gale Group, "Electrical and Electronic Ceramics," Supplier No. 42719072, High Tech Ceramics News, v3, n11, pN/A, Feb. 1992.

The Gale Group, "Panoderm I Lotion" (Trade Newsletter) Manufacturer: American Biologics, Category: Beauty Skin Care, Supplier No. 40800116, Product Alert, v19, n21, pN/A, May 22, 1989.

The Gale Group, "Chemophobia Haunts Food Preservative Suppliers," Chemical Business, 55-601 (Jan. 1984).

The Gale Group, "Basic Boron Prices have Soared due to the Demand for Insulation Materials and the Limited Supplies of Sodium Tetraborate (Borax) and Boric Acid," CPI Management Services, p. 5, 61, Jan. 16, 1978.

\* cited by examiner

FLAME RETARDANT AND MICROBE INHIBITING METHODS AND COMPOSITIONS

This patent application is a continuation-in-part patent application of nonprovisional patent application U.S. Ser. No. 10/408,072, filed on Apr. 4, 2003, now abandoned, which is a continuation-in-part patent application of nonprovisional patent application U.S. Ser. No. 10/176,411, filed on Jun. 19, 2002, now abandoned, from prior provisional patent application U.S. Ser. No. 60/348,543, filed on Jan. 16, 2002, now abandoned. U.S. Ser. No. 10/408,072, U.S. Ser. No. 10/176,411 and U.S. Ser. No. 60/348,543 are each incorporated by reference in their entireties herein. This patent application claims the benefit of provisional patent application U.S. Ser. No. 60/348,543.

BACKGROUND OF THE INVENTION

1. Field of the Invention

The present invention generally relates to fire retarding and microbe inhibiting compositions, and to methods for reducing the amount of burning that occurs to materials, and/or the amount or density of smoke, toxic gases and heat release produced by the materials, when the materials are exposed to fire, and for inhibiting or preventing the growth, deposit or build-up of microbes on materials when they are exposed to conditions favorable to the growth of microbes.

More particularly, the present invention relates to combined property, dual-action, penetrating fire retardant and mold inhibiting aqueous chemical compositions that may be applied, for example, as a coating in a single or multiple application to one or both sides of the surfaces of materials, such as paper board binders adhered to dry wall, or that may be added to, or mixed with, materials during their manufacture or other production, and to processes for applying these compositions to the materials. Treatment of the materials may be made either prior to, or after, first coat or finish coat paints, coatings, joint tape or other compounds are applied to the materials, for example, to the interior building materials Gypsum Wall Board (dry wall), ceiling tiles or any other porous or suitable substrates, such as wood or concrete. This allows the combined property, dual-action, penetrating fire retardant and mold inhibiting compositions to be applied to uncoated building materials and/or to first coats, finish coats or other coats of paint. This accords simplicity, flexibility and versatility of application resulting in finished product materials that generally have significantly reduced ASTM Class I flame spread and smoke generation indices. In addition, it accords antimicrobial (mold, mildew, etc.) inhibition properties to the materials (prior to and/or after the materials have been exposed to conditions favorable to the growth of microbes).

2. Background Information

Fires

Fires are a frequent and extremely costly hazard in the United States, and throughout the world, and often result in severe injuries or deaths to human beings and animals, in extensive real and personal property destruction and other hazards. In 1998, for example, there were 517,500 fires in buildings reported to the National Fire Protection Association (NFPA), which means that a fire occurred in a building structure approximately every 61 seconds throughout the year. NFPA estimates the damage caused by fires in 1998 to be almost seven billion dollars. Each year, over three million fires leading to approximately 29,000 injuries and 4,500 deaths are reported in the United States alone.

In October of 2003, the largest wildfire outbreak in California history caused fires to rage completely out of control for about two weeks in locations within California, including Los Angeles, resulting in a two billion dollar disaster that claimed approximately 3,335 homes and 20 lives. Thousands of California residents were forced to evacuate their homes and relocate to shelters.

Fires often cause the structural collapse of buildings, potentially causing occupants or inhabitants to be injured or killed by falling building materials and debris. For example, since they were built in 1973, the 110-story twin towers of the New York World Trade Center had been the fifth and sixth tallest buildings in the world, and had hosted an estimated 50,000 employees, and received an average of 1.8 million visitors, annually. These buildings had survived powerful hurricane gusts, with one of them also surviving a bomb explosion in 1993 that created a 22-foot wide, 5-story deep, crater at its base. However, both towers were reduced to rubble after they collapsed in billows of smoke and debris following the intentional crash of airplanes into their sides on Sep. 11, 2001. Despite initial damage caused by the airplane crashes, the towers remained standing for over an hour, and initially appeared to be a testimony to the abilities of structural engineering. However, experts subsequently concluded that structural damage to the buildings was caused mostly by fires following the impacts, and that this damage was evidently severe enough to overburden the lower sections of the towers and eventually cause both towers to collapse. Richard Behr, a professor of architectural engineering at Pennsylvania State University, pointed out that the approximately one-hour delay in the collapse of the towers suggests that the main damage was likely caused, not by the airplane strikes themselves, but by the fires that burned inside of the two buildings for more than an hour following the crashes. These fires, fueled by the fuel tanks present in the airplanes, likely caused the steel beams present in the buildings to melt and lose their stiffness. In the ABC news article entitled "Final Collapse, Experts: Twin Towers were Designed to Withstand High Impact" that appears on the Internet at www.ABCNEWS-.com, Professor Behr states that, "It was the post impact fire that was the major culprit." He further states that, "After the impact, there was no sign of stress," and "[Then], after an hour of flame, weakened steel [led to the] collapse." Thousands of people who had been in the twin towers on Sep. 11, 2001, lost their lives, or were severely injured by smoke, fire and/or falling debris, suffering severe smoke inhalation, burns and/or other injuries.

The most significant cause of death in building fires is smoke, which often contains toxic gases, and which accounted for 73% of office-related deaths in 1990 according to a 1994 report by the National Fire Protection Association. The remainder of the deaths were caused by burns and falling building structures.

Fire can spread over many items found in buildings, such as dry wall, floor coverings, wood structural members, molding, window and wall coverings, and furniture, thereby producing dense, and often deadly, smoke that may contain toxic gases.

Mold and Mildew

Mold and mildew (types of fungi) are simple, microscopic microorganisms that can grow virtually anywhere if they have adequate nutrients, moisture and appropriate temperatures, as well as adequate time under these conditions. Food sources for mold and mildew include wood, wood resins, tree pollens and nutrient-rich dirt. Most materials found in homes and other buildings will support the growth of mold and mildew if they become damp. However, molds cannot grow on dry materials, even if all other conditions are ideal for their growth. The amount of moisture required for fungal growth can vary depending upon the material that serves as the substrate for the organism, and upon the organism. However, the effect of relative humidity is indirect, and very small amounts of moisture will permit fungal growth. Unfortunately, moisture can become present within building walls, ceilings, attics and crawlspaces via gravity, capillary action, air leakage and/or diffusion, and is often not discovered or detected until after fungi have grown, and have contaminated the air and air handling systems.

Spores of dozens of kinds of mold and mildew are present at all times in indoor and outdoor air. These spores, which are similar to seeds, are microscopic and, thus, are difficult to detect until they colonize. They can settle, germinate and grow wherever good growth conditions are found. They can grow on soil, plants, dead plant materials, food, fabrics, paper and wood, as well as on many other materials. Spores can colonize in as few as 18 hours under ideal conditions. It is postulated that such colonization may lead to sporulation, and subsequent aerosol emissions of harmful toxins, in periods as short as 72 hours.

In order for mold and mildew spores to form visible colonies, they need food, moisture (for example, about 75% relative humidity), air (oxygen) and appropriate temperatures (generally between about 40° F. and about 90° F.). Depending upon the particular mold or mildew, growing colonies can be almost any color from white to black. Most household molds and mildews, however, are black, grey or charcoal colored.

Fungi deposited or growing on the surfaces of materials are capable of generating particulate (spore) and gas phase (VOC) emissions, and become aerosolized. Sporulating fungi depend upon aerosol emission for propagation. Many factors, such as activity (translational energy), airflow and relative humidity, affect the emission and dissemination of fungi into the indoor air from a contaminated source.

Typical building materials that are susceptible to mold growth include ceiling tiles, textiles, insulation, wallboard, floor coverings, wall coverings, paint, furniture, wood and paper. Moisture may be introduced to these building materials as a result of direct water damage, for example, by burst water pipes, roof leaks, floods, and similar occurrences, or indirectly at vapor barriers with marked temperature variances, which can cause water accumulation.

*Stachybotrys chartarum* is a greenish-black, widespread saprophytic fungus that produces potentially hazardous toxigenic spores, and that can grow on materials having a high cellulose, and a low nitrogen, content, such as fiberboard, Gypsum Wall Board, dust and lint. It requires high levels of moisture (about 94% relative humidity) and cellulose-containing materials for growth. It is considered to be the most hazardous of the toxigenic fungi found in wet buildings, and produces very potent cytotoxic macrocyclic trichothenes along with a variety of immunosuppressants and endothelin receptor antagonist mycotoxins. This fungus has been associated with building-related illnesses, and with the death of newborns, and can cause a fatal condition in animals when ingested, for example, on moldy hay. Recommended remediations for ceiling tiles or wall boards colonized extensively with *Stachybotrys chartarum* usually involve the complete replacement of these materials using protective measures. Studies described in "Sanitation of Wallboard Colonized with *Stachybotrys chartarum*" *Current Microbiology*, Vol. 39, pages 21-26 (1999), indicate that control samples of uninstalled Gypsum Wall Board and ceiling tiles, available from local distributors, can contain a baseline bioburden following manufacture and storage, including the fungus *Stachybotrys chartarum*, that will colonize on surfaces of these building materials under high humidity conditions.

Molds and mildews are often very destructive to materials (substrates) on which they grow. They often cause staining, decomposition (rotting of materials) and objectionable, musty odors. If mold conditions are permitted to exist for a period of time in a wood structure, the wood can quickly become weak and rotten. Fabrics and paper can be seriously damaged or destroyed within days by damp, moldy conditions. Often, repair of the surfaces of the materials, as well as refinishing, is required. Further, certain damaged materials may not be salvageable.

Where colonies of mold or mildew are extensive, they can produce enough spores, and by-products, to be harmful to the health of animals and human beings. Many of the by-products of mold and mildew are irritating to the skin, eyes and respiratory tracts. Further, many molds produce small molecular toxins (mycotoxins) that are harmful to the skin, and poisonous if ingested or inhaled in quantity, posing a serious or extreme health hazard to animals and humans. Toxigenic molds include, for example, *Stachybotrys, Aspergillis* and *Penecillium*. Some molds can produce life-threatening illnesses under the right growth and exposure conditions.

The United States Environmental Protection Agency ("EPA") reported in a document published in 2002, and entitled "Children's Health Initiative: Toxic Mold" (located on the Internet at http://www.epa.gov.appcdwww/iemb/child.htm), that outbreaks of *Stachybotrys chartarum* were investigated for an association with the deaths of infants in Cleveland, Ohio, and with serious health problems in other areas of the United States. The fungus was investigated for its association with the serious health problems of a family living in a water-damaged home in Chicago, Ill., and had been implicated in several other cases of building-related illnesses. A cluster of cases of acute pulmonary hemorrhage/hemosiderosis had been reported in Cleveland, Ohio, where twenty-seven infants from homes that suffered flood damage became sick, with the illness starting in January of 1993. Nine deaths occurred.

In the past, it has often been impossible to control mold and mildew where moist materials exist for a period of time. One family (the Ballards), while living in Texas, had their home demolished in 2002 as a result of mold infestation that could not be removed from the home. The family's son suffered permanently scarred asthmatic lungs, while the father lost his memory, as well as his job. Prior to demolishing their house, the mold growth became so extreme that the family had to use hepa filters to enter the house.

Once a source of moisture has been discovered and eliminated, traditional mold clean-up procedures involve washing the affected areas with a household bleach solution (one cup per gallon of water) that remains in contact with the surfaces of the affected areas for a period of at least 15 minutes. However, these procedures are often time-consuming and objectionable because of the odors produced by the bleach solution. Further, it is often difficult to permit a bleach solution to remain in contact for a lengthy period of time with an affected area that is in a vertical position. Moreover, this type of a clean-up procedure may be completely ineffective.

Fire Retardant or Mold Inhibiting Products

Gypsum Wall Board and tile are utilized extensively in the United States, and in many other developed countries, for interior walls and ceilings. Surface finishing is generally required for paper board substrates to cover blemishes, joint tape, nail holes and/or other irregularities. First and finish coat paints and coatings are generally applied through spraying, brushing, wiping, rolling or immersing. Numerous fire retardant, and mold inhibitor, paints or coatings, rather than coatings that adhere to porous surfaces of a substrate by incorporating within the matrix of the treated substrate, are presently utilized in an attempt to reduce the flame spread, smoke generation and/or mold growth properties of interior building materials. Those who are familiar with the current practice for treating wall board will recognize that surface treatment is usually reserved for application to only one side of the wall board, the side that faces the enclosure interior.

It is known in the art that fire retardant paints and mold inhibitors can be applied to new construction, non-coated, production run Gypsum Wall Board to attempt to enhance fire retardant and mold resistance properties of the dry wall. However, one of the disadvantages of applying flame retardant, or mold inhibiting, surface coatings or paint to production run, untreated Gypsum Wall Board is that the paper substrate binding the Gypsum Wall Board becomes surface coated, but lacks adequate dispersion within the substrate matrix to form a more effective dry film surface coating for protective purposes, and continues to be the primary source of flame spread, or of the growth of microbes, such as mold.

It is also known in the art that fire retardant paints and mold inhibiting compositions can be applied to Gypsum Wall Board that is to be refinished or rehabilitated for the purpose of attempting to enhance fire retardant and mold inhibiting properties of the dry wall. However, one of the disadvantages of applying flame retardant paints or mold inhibitors for refinishing or rehabilitating Gypsum Wall Board is that the layers of paint present on, and the paper substrate binding, the dry wall are not adequately adhered to the newly-applied, finish surface coat of fire retardant paint or mold inhibiting composition. The layers of paint present on, and the paper substrate binding, the Gypsum Wall Board, therefore, continue to be the primary source of flame spread, or of the growth of microbes, such as mold.

DESCRIPTION OF THE ART

U.S. Pat. No. 1,339,488 ("the 488 patent") describes a method for fire proofing fibrous materials using a solution containing preferably 6% or over of soluble borate to which a proportion of an alkali, such as potassium carbonate, has been added. In contrast with the methods and compositions of the present invention, the method described in the '488 patent requires a series of steps, and is time-consuming. Also in contrast with the methods and compositions of the present invention, the '488 patent does not teach or suggest anything about the inhibition of microbes on materials, about the use of a potassium salt of an organic acid (or any weight percents thereof), about the use of a surfactant (or any weight percents thereof), about the use of a microbe-inhibiting compound in addition to one or more other components having antimicrobial properties (or any weight percents thereof, about the use of a detection component (or any weight percents thereof), about any weight percent of an aqueous liquid or about the rates of application described herein.

U.S. Pat. No. 6,335,308 ("the '308 patent") describes an aqueous sprayable plant fertilizer composition that is stated to discourage or eliminate infestation of plants by certain insects, such as aphids. In contrast with the methods and compositions of the present invention, the '308 patent does not teach or suggest anything about the retarding of fires, about the inhibition of microbes on materials, about the use of a potassium salt of an organic acid (or any weight percents thereof), about the use of a surfactant (or any weight percents thereof), about the use of a microbe-inhibiting compound (or any weight percents thereof), about the use of a detection component (or any weight percents thereof), about the weight percent described herein of an alkaline metal inorganic salt, about pH or about the rates of application described herein.

U.S. Pat. No. 4,756,839 ("the '839 patent") describes an aqueous solution for projection (by spraying, pumping, etc.) onto an existing fire that includes potassium carbonate, a boron-containing compound, a potassium salt of an organic acid having from 1 to 6 carbon atoms and water, and that is stated to be effective in extinguishing fires, for example, grease fires on cooking surfaces or coal fires. In contrast with the methods of the present invention, in which a composition of the invention is applied to a material prior to the material being exposed to a fire (or to conditions favorable to the growth of microbes), the compositions described in the '839 patent are not employed until after a fire has commenced (to extinguish an existing fire). Further, the '839 patent does not teach or suggest anything about microbes, about surfactants (or any weight percents thereof), about microbe-inhibiting compounds (or any weight percents thereof), about detection components (or any weight percents thereof) or about pH levels. Moreover, it provides only vague statements concerning the rate of the application of the compositions described therein to fires. It states, for example, in column 4, lines 2-4, that "Three pounds of the composition were applied to and extinguished 16 separate grease fires."

U.S. Pat. No. 4,961,865 ("the '865 patent") describes methods and compositions for inhibiting the combustion of wood and other cellulosic materials by impregnating the materials with the compositions. In contrast with the methods and compositions of the present invention, the '865 patent does not teach or suggest anything about the use of a potassium salt of an organic acid (or any weight percents thereof), about the use of a surfactant (or any weight percents thereof), about the use of a microbe-inhibiting compound in addition to one or more other components having antimicrobial properties (or any weight percents thereof), about the use of a detection component (or any weight percents thereof), about the weight percent described herein of an alkaline metal inorganic salt or about the rates of application described herein.

Patent Application Publication Number U.S. 2003/0017565 A1 ("the 0017565 A1 application") describes methods and compositions for treating a porous article, such as wood, to provide flame retarding, rust-preventing, organism-repellant and other properties thereto by performing enzymatic macromolecularization reactions in the article using an enzyme having a polyphenol oxidizing activity (obtained by the cultivation of a fungus) in an alkaline pH region. The multi-step methods include an impregnation treatment of the article under pressure or reduced-pressure, subsequent macromolecularization reactions and a leaching operation. In contrast with the methods and compositions described in the 0017565 A1 application, the methods and compositions of the present invention are much simpler and more rapid, and are effective in retarding flame and smoke, and in inhibiting the growth, build-up or deposit of microbes on materials, without the use of a polyphenol oxidizing enzyme (or any enzyme), a substrate for such enzyme (or for any enzyme), or any enzymatic macromolecularization processes or reactions. Further, in contrast with the methods and compositions of the present invention, the 0017565 A1 application does not teach or suggest anything about compositions or methods for inhibiting the growth of mold or mildew on materials, about the weight percents of surfactants described herein, about the weight percents of alkaline metal inorganic salts described herein, about the use of a detection component (or any weight percents thereof) or about the application rates described herein.

European Patent Application Publication No. 0 285 721 ("the 0 285 721 application") describes a method for protecting wood against fungal growth and fire that comprises applying to the surface of the wood an aqueous solution of sodium carbonate and sodium borate. In contrast with the methods and compositions of the present invention, the 0 285 721 application does not teach or suggest anything about the use of a potassium salt of an organic acid (or any weight percents thereof), about the use of a surfactant (or any weight percents thereof), about the use of a detection component (or any weight percents thereof), about the weight percent described herein of a microbe-inhibiting compound or about the rates of application described herein.

International Patent Application Publication No. WO 02/06021 A2 ("the WO 02/06021 A2 application") describes compositions comprising a boron source composition, a melamine binder resin and a urea casein activator resin that are stated to protect wood products from attack by termites, fungi, fire and flame, and methods for using these compositions. In contrast with the methods and compositions described in the WO 02/06021 A2 application, the methods and compositions of the present invention are much simpler and more rapid, and are effective in retarding flame and smoke, and in inhibiting the growth, build-up or deposit of microbes on materials, without the use of a melamine binder resin or a urea casein activator resin. Further, in contrast with the methods and compositions of the present invention, the WO 02/06021 A2 application does not teach or suggest anything about the use of an alkaline metal inorganic salt in addition to the use of a boron source composition (or any weight percents thereof), about a potassium salt of an organic acid (or any weight percents thereof), about the use of a surfactant (or any weight percents thereof), about the weight percents of a microbe-inhibiting compound described herein, about the use of a detection component (or any weight percents thereof) or about the application rates described herein.

International Patent Application Publication No. WO 00/00570 ("the WO 00/00570 application") describes a method for flame proofing insulating materials made with renewable raw materials. The insulating materials are impregnated with an aqueous impregnating solution containing 5 to 20 weight percent sodium and/or potassium carbonate as a flameproofing and fungicide agent, and additionally with 2 to 10 weight percent of a tenside as a fungicide. In contrast with the methods and compositions described in the WO 00/00570 application, the methods and compositions of the present invention are effective in retarding flame and smoke, and in inhibiting the growth, build-up or deposit of microbes on materials, without the use of a tenside. Further, in addition to other differences, in contrast with the methods and compositions of the present invention, the WO 00/00570 application does not teach or suggest anything about the use of a potassium salt of an organic acid (or any weight percents thereof), about the use of a microbe-inhibiting compound (or any weight percents thereof) or about compositions having an elevated pH. As a result of the potassium salt of an organic acid that is present in the compositions of the present invention, these compositions will generally permit the release of components that disrupt fire reactions at a lower temperature and, therefore, more rapidly, than the compositions described in the WO 00/00570 application.

Significant differences also exist between the methods and compositions of the present invention and U.S. Pat. Nos. 3,877,979, 4,234,340, 4,303,726, 4,461,721, 4,610,881, 4,725,382, 4,816,186, 5,399,190, 5,612,094, 6,333,399, JP 2002-226828, JP 2000-108108, RU 2178029 and EP 0 636 461. For example, the compositions described in many of these patents and published patent applications require the use of specified components that need not be present in the compositions of the present invention in order for the compositions of the present invention to be effective in retarding fire, and in inhibiting the growth, deposit or build-up of microbes on materials.

The articles that follow discuss potassium-based compounds. Reference I. "Suppression Mechanisms of Alkali Metal Compounds," Halon Options Technical Working Conference Proceedings (1999). Williams & Fleming, US Naval Research Laboratories, found that potassium salts are 2 to 3 times more efficient than sodium salts. Reference II. "Pyrogen Fire Suppression Grenades" Halon Options Technical Working Conference Proceedings (1999). Berezovsky and Joukov, AES International, Huntsville, Australia, found that potassium radicals are very active, react with the "chain carriers" OH, H, and O, which they remove from the fire zone, thus disrupting the fire reaction. Reference III. "Full Scale Evaluation of the Water Mist Additive, QUAD-EX, Back & Williams, Naval Research Laboratories," Halon Options Technical Working Conference Proceedings (1999). QUAD-EX extinguished full-scale hydrocarbon fires within 20 seconds, whereas the utilization of water on a stand-alone basis required over 2 minutes to extinguish the fire. QUAD-EX is a potassium-based aqueous chemical.

The articles that follow discuss elemental potassium, pH properties or antimicrobial inhibiting compounds. Reference I. "Intercept®, A Fungistat and Bacteriostat for Incorporation into Various Products," Interface, Inc. (Kennesaw, Ga. 2002). Reference II. Material safety data sheet and literature for Polyphase P-100, Troysan Biocide Polyphase Products, Troy Corporation (Floram Park, N.J. 2001). Reference III. "Osmo Regulatory Mechanisms," McGraw Hill *Encyclopedia of Science and Technology* (8$^{th}$ Edition, McGraw Hill Book Company, New York, 1997). This reference states that sodium and potassium find an isotonic equilibrium in the plasma membranes of plant or fungal cell walls.

It appears that, if the membrane is exposed to a hypertonic solution of excess potassium, the cell releases sodium, causing the collapse of the membrane cell margin. With shrinkage, the cell becomes crenate. Recent research performed by Peter Agre, of the Johns Hopkins University School of Medicine, and Roderick Mackinnon, of Howard Hughes Medical Institute, who were jointly awarded the Nobel Prize in Chemistry for 2003 by the Royal Swedish Academy of Sciences, has shown that, under conditions of higher concentrations of potassium ions, cells cannot close to stop the invasion of the potassium ions. Some of this research is discussed at the web site www.nobel.se/chemistry/laureates/2003.

There is presently a need in the art for dual-action, combined property, surface adherent compositions that can be applied separately or independently to untreated and/or to finally finished interior building materials to reduce the spread of flame, and/or the amount or density of smoke and toxic gases produced, when the materials are exposed to fire, and to inhibit the growth, build-up or deposit of microbes, such as mold or mildew, on the materials when they are exposed to conditions that are favorable to the growth of microbes. Additionally, there is presently a need for improving currently-available processes for the application of fire retardant and mold inhibition substances to interior building materials for new construction, as well as for refinished or rehabilitated interiors. It would be advantageous for flame spread and mold growth reduction to treat both sides of a paper binding a wall board, or another material. Most importantly, there is presently a need for improving the resistance of currently available building materials against undetected sources of excess moisture, and the build-up or deposit of microbes upon the materials, for a period of longer than 18 to 72 hours to provide additional time (time that would otherwise generally not be available) to discover and eliminate the sources of excess moisture (prior to any growth of microbes, or the potential contamination of the air and/or air handling systems).

The present invention provides compositions that surprisingly and unexpectedly, when applied to the surfaces, or other components, of materials prior to exposure to fire, or prior to or after exposure to conditions favorable to the growth of microbes, or when added to, or mixed with, the materials during their manufacture or other production, advantageously reduce the amount of burning that occurs to the materials, and/or the amount or density of smoke and toxic gases produced by the materials, when the materials are exposed to fire, and additionally prevent or inhibit the growth, build-up or deposit of microbes on the materials when the materials are exposed to conditions favorable to the growth of microbes.

The compositions of the invention advantageously lengthen the amount of time that is generally available for: (a) escaping from a fire; (b) avoiding death or injuries that can be caused by a fire, for example, as the result of an inhalation of deadly smoke or falling debris; (c) extinguishing a fire; (d) breathing air that is free from mold after excess moisture or water develops or accumulates, for example, as a result of an undiscovered leak, thereby, preventing or reducing illness that may be caused by inhaling air that contains mold; and/or (e) discovering an undetected water leak (or other accumulation of water or excess moisture) prior to any mold growth and, therefore, prior to mold becoming present in the air, or circulated by air handling systems, and being inhaled by human beings and animals. In other words, these compositions advantageously "buy" time that would be unavailable if the compositions had not been employed with various materials, which can result in a difference between life and death. Thus, the compositions of the invention can result in the saving of lives, in the reduction or prevention of smoke and/or mold inhalation illnesses, and the saving of large costs that would otherwise be necessary for the repair of damage caused by fire, water and/or excess moisture.

For example, many water leaks remain undetected by occupants or inhabitants of buildings, such as houses. If a house develops an undetected water leak, at about 70-90% humidity, mold can grow in a period of from about 18 to 72 hours. Once the mold is produced, it can become present in air contained in the house, and circulated by air handling systems, causing occupants or inhabitants of the house to become very ill. If, however, a composition within the invention is applied to one or more surfaces of building materials employed in the house, such as dry wall, mold likely will not be produced in the house at all and, thus, will not cause occupants or inhabitants of the house to become ill. If mold is produced in the house, it will advantageously generally be produced much later in time than 72 hours after an undiscovered water leak has become present in the house, thereby significantly lengthening the amount of time available before mold can cause occupants or inhabitants of the house to become ill. In such case, it is likely that the water leak will advantageously be detected, for example, by the accumulation of moisture or water, prior to any mold developing within the house.

Advantageously, as a result of the highly soluble nature of active components that are present in the compositions, such as potassium, the compositions of the invention, which are aqueous solutions or dispersions, are generally more concentrated than other known solutions or dispersions, permitting a significantly greater quantity of the active components to be present in the same quantity of liquid. Because active components present in the compositions become highly concentrated in an aqueous liquid, when the compositions are applied to one or more surfaces of materials, such as dry wall, these active components become present thereon in a more concentrated manner in comparison with other known solutions or dispersions. Further, the compositions of the invention advantageously are cost effective, and may be handled and applied without the need for elaborate safety precautions.

The present invention also provides processes for applying the compositions of the invention to materials. The compositions and methods of the present invention should reduce, or prevent, the loss of, or injury or damage to, life and/or property resulting from fires, floods, water leaks, accumulations of condensed water, storms, various acts of nature or similar occurrences or events.

The application of dual-action, adherent coating, combined property, fire retardant and microbe inhibiting compositions to untreated, as well as to first coat and finish coat surfaces, to reduce flame spread, and to inhibit or prevent the growth, build-up or deposit of microbes on the surfaces, that impact interior walls and ceilings is demonstrated by the examples presented herein.

SUMMARY OF THE INVENTION

The present invention provides combined property, dual-action compositions for application to a material prior to an exposure of the material to fire, or prior to or after an exposure of the material to conditions favorable to the growth of microbes. When compositions within the invention are properly applied to a material prior to the material being exposed to fire, or prior to or after exposure of the material to conditions favorable to the growth of microbes, these compositions reduce the amount of burning that occurs to the material, and/or reduce the amount or density of smoke or toxic gases produced by the material, when the material is exposed to fire. They also inhibit or prevent the growth, build-up or deposit of microbes on the material (or reduce amounts already present thereon).

The present invention also provides methods for reducing the burning of, and/or the amount or density of smoke or toxic gases produced by, a material that is exposed to fire, and for inhibiting the growth, build-up or deposit of microbes on a material that is exposed to conditions favorable to the growth of microbes, comprising applying a composition of the present invention to the material at least one time prior to the material being exposed to the fire, or prior to or after being exposed to conditions favorable to the growth of microbes, at a rate of about 1 gallon per from about 100 to about 1,000 square feet of the material.

It is accordingly an object of the present invention to apply a combined property, dual-action adherent dry film coating fire retardant and mold inhibiting composition, for example, by brushing, wiping, spraying or immersing, using sequential treatments of the composition, to a material, such as a non-coated production run interior building material and/or a first coat or finish coated interior building material, prior to the material being exposed to fire, and/or prior to or after the material being exposed to conditions favorable to the growth of microbes. The proper application of this composition to the material generally will effectively reduce the amount of burning that occurs to the material, the flame spread, the amount or density of smoke or toxic gases produced by the material and/or the growth, build-up or deposit of microbes on the material when the material is exposed to fire and/or to conditions favorable to the growth of microbes (or when a growth, build-up or deposit of microbes is already present on the material). This object of the invention is generally achieved by applying one or more sequential treatments of a combined property, dual-action fire retardant, microbe inhibiting chemical composition of the present invention to the material at least one time prior to the material being exposed to the fire, or prior to or after the material being exposed to conditions favorable to the growth of microbes, at a rate of about 1 gallon per from about 100 to about 1,000 square feet of the material.

Another object of the invention is to include in the composition an antimicrobial, mold inhibiting compound that is preferably a commercial registered product.

These and other objects and features of the present invention will be apparent from the following detailed description of the preferred embodiments of the invention.

DETAILED DESCRIPTION OF THE PREFERRED EMBODIMENTS

The present invention may be understood more readily by reference to the following detailed description of the preferred embodiments of the invention.

Definitions

For purposes of clarity, various terms and phrases used throughout this specification and the appended claims are defined in the manner set forth below. If a term or phrase used in this specification, or in the appended claims, is not defined below, the term or phrase should be given its ordinary meaning.

The phrase "at a rate of about 1 gallon per from about 100 to about 1,000 square feet of the material" as used herein means that about 1 gallon of a composition of the invention is applied to from about 100 to about 1,000 square feet of a material, and includes all equivalents of this rate, some of which are shown below:

| Amount of Composition | Square Feet of Material |
|---|---|
| 1 gallon | from about 100 to about 1,000 |
| ½ gallon | from about 50 to about 500 |
| 1 quart | from about 25 to about 250 |
| 1 pint | from about 12.5 to about 125 |
| 1 cup | from about 6.25 to about 62.5 |
| 8 ounces | from about 3.125 to about 31.25 |
| 1 ounce | from about .39 to about 3.9 |

The terms "applied," "applying" and "application" as used herein in connection with a composition of the present invention mean: (a) the adding and/or mixing of a composition of the invention with a material during the manufacture or other production of the material in a manner that results in the composition being present on one or more of the surfaces of the material at the application rates described herein, preferably with the surfaces of the material being covered in their entireties; (b) the treatment or impregnating of a material with a composition of the invention by placing or spreading the composition on or over one or more surfaces of the material, preferably covering one or more surfaces of the material in their entireties, for example, by spraying, wiping, painting, brushing, rolling, immersing, drenching or other means known by those of skill in the art; or (c) the treatment of a material in any other manner which results in a composition of the invention being placed, deposited or spread on one or more of the surfaces of the material, preferably in their entireties, at the application rates described herein.

The abbreviation "ATCC" as used herein refers to the American Type Culture Collection (Rockville, Md.).

The phrase "being exposed to" as used herein means coming in the presence of, near to, or into contact with.

The terms "burn" and "burning" as used herein mean the production of heat, light and/or combustion, for example, by smoldering (burning with no flame or a slow fire), by charring, by scorching, by the production of a flame, or by the spread of smoldering or a flame (an increase in the area over which, or depth in which, smoldering or a flame is present), or that a material has been burned during the uninterrupted course of the "burn."

The terms "char" and "carbon-char" as used herein mean a substance or condition that results on or near the surface of a flammable substrate from the incomplete combustion of the flammable substrate, and that has the ability to reduce flammability and/or heat release by insulating the flammable substrate from heat, combustion and/or fire, thereby reducing flame spread and/or penetration and, thus, the production of smoke and toxic gases.

The terms "charred" and "charring" as used herein mean the act of producing char or carbon-char.

The term "combustion" as used herein means a chemical change, especially oxidation, generally accompanied by the production of heat and light.

The term "composition" as used herein means a product that results from the combining of more than one ingredient.

The phrases "conditions favorable to microbe growth" and "conditions favorable to the growth of microbes" as used herein mean conditions of moisture, temperature, food supply, oxygen, present microbe growth and/or like conditions that promote (encourage, facilitate or enable the initiation, or continuation, of for greater than a period of several hours) the growth, build-up or deposit of one or more different types of microbes, such as mold or mildew, or colonies thereof, on a substrate, such as a material, as are known by those of skill in the art.

The term "fire" as used herein means a chemical reaction that releases heat and/or light, and that is often rapid and persistent, for example, the exothermic combination of a combustible substance with oxygen.

The term "floor covering" as used herein means any of a wide variety of materials or coverings that may be employed as, or placed over, a floor (a surface upon which one may stand), and includes, but is not limited to, vinyl, linoleum, wood, tile, carpet, carpeting and the like, as well as any paper or other backings that may be present on, or bound to, such items.

The terms "inhibit," "inhibiting" and "inhibition" in connection with the growth of microbes on a material to which a composition of the invention has been applied, and that has previously, simultaneously or subsequently been exposed to conditions favorable to the growth of microbes, mean that: (a) the number of microbes, or colonies thereof, that grow, form, become built-up or deposited, or remain on the material is fewer than would have occurred under the same circumstances and conditions with a material that is the same, but that did not have a composition of the invention applied to it; and/or (b) the amount of time that it takes for microbes, or colonies thereof, to grow, form or become built-up or deposited on the material is less than would have occurred under the same circumstances and conditions with a material that is the same, but that did not have a composition of the invention applied to it. Such results may be determined by methods known by those of skill in the art, such as by the ASTM G 21-96, ASTM 3273-94, ASTM 3274-95 and AATCC methods described herein. This inhibition may result in no microbes, or colonies thereof, growing, forming, becoming built-up or deposited, or remaining on the material, or being visible on the material by a 6× power, or greater, magnification.

The term "material" as used herein means any type of material, or a component of such material, as is known by those of skill in the art, that can be used in the construction industry, that is capable of partially or fully burning and/or having at least one type of microbe (or colony thereof) grow, or become built-up or deposited, thereon, and that is, or will be, positioned in a structure, such as a building (house, townhouse, condominium, apartment, duplex, hotel, motel, school, grocery store, convenience store, gas station, business, office building, manufacturing plant, restaurant, clinic, hospital, theater, etc.), or a portion of a structure, such as an attic, crawl space or basement, in a manner that its surfaces will not be exposed to rain, snow, sleet or other environmental elements or liquids in an amount that would be sufficient to render ineffective (wash away, dissolve, deplete or otherwise render ineffective) active solids, such as salts, that may be present in an aqueous solution or dispersion applied to its surfaces, as could readily be determined by those of skill in the art. Preferably, the material will not be exposed to rain, snow, sleet or similar environmental elements or liquids, and will be positioned within the interior portions of a structure or other portions of the structure that are not exposed to environmental conditions, such as rain. The material may be in a new condition, in a "raw" condition (not painted, coated or otherwise treated in any manner), or may be in a "treated" condition (containing, for example, one, two, three, four, five or more coats of paint or other coatings, compounds or compositions), and preferably is porous, and has one or more surfaces that can be penetrated by compositions of the present invention. Examples of material include, but are not limited to, walls, wallboard (the front and back sides, and other portions, of Gypsum Wall Board and other types of wall board), various types of paper (including the Kraft or other paper bound to the front or back side of wall board), board paper binder, paper pulp, wall coverings, fiberboard, ceilings, ceiling tiles, ceiling coverings, floors, floor tiles, floor coverings, paints, furniture, various types of woods and lumber (and other cellulosic materials), wood pulp, concrete, textiles, insulations, other compositions used to produce the walls or ceilings of the interiors of buildings, joint compounds, joint tape, other types of tape, other porous substrates, paper or other backings that may be present on, or bound to, any of the foregoing (such as vinyl or linoleum flooring), and similar or comixed materials. When the material is Gypsum Wall Board, it may be, for example, new construction, non-coated, production run Gypsum Wall Board, or Gypsum Wall Board that has been previously painted (with one, two, three, four, five, six or more coats of paint), and that is to be refinished and/or rehabilitated by, for example, additional painting (the application of one or more additional coats of paint to the Gypsum Wall Board). If none of the surfaces of a material (for example, steel that has been coated with a non-organic protection and that is employed to produce steel supports) can provide a source of food for at least one type of microbe, the material may not be capable of having at least one type of microbe grow, or become built-up or deposited, thereon. However, metal surfaces, such as steel, that are partially or fully covered with soil, dirt or dust from the environment, contain a source of food for microbes and, thus, would be capable of having at least one type of microbe grow, or become deposited, thereon.

The term "metal" as used herein in connection with components of compositions of the present invention means any element that forms positive ions when its compounds are in solution or dispersion, and whose oxides form hydroxides, rather than acids, with water, for example, iron, copper, cobalt, potassium, sodium, lithium and other elements listed in the Periodic Table.

The term "microbes" as used herein means minute living organisms that may grow, form colonies, or become built-up or deposited, on a material, and that may be capable of causing one or more diseases in human beings and/or animals, and include, for example, various types of bacteria, protozoa and fungi (including mold and mildew), such as the bacteria *Escherichia coli*, *Saccharomyces cerevisiae*, *Legionella Pneumophila* (and other species of Legionella) and *Staphylococcus aureus*, and the fungi *Aspergillus niger* (ATCC No. 9642), *Penicillum pinophilum* (ATCC No. 11797), *Chastomium globosum* (ATCC No. 6205), *Gilociadium virorx* (ATCC No. 9645), *Aureobasidium pullulans* (ATCC No. 15233), *Aspergillus flaviceps*, *Aspergillus flavus*, *Acromonium sulcum*, *Ascotrichum Iusitanlca*, *Stachybotrys chartarum*, *Bacillus megaterium*, *Aspergillus nidulans*, *Botrytis cinerea*, *Myrothecium roridum* or *Myrothecium Verrucaria*. Further examples of bacteria and fungi are present in Patent Application Publication Number US 2003/0017565 A1.

The term "moisture" as used herein means wetness or dampness than can be felt or otherwise detected as vapor in the atmosphere, or as a liquid present on the surfaces of objects. Moisture may contain, for example, water, water-based substances or solutions, or other substances that can be present as a vapor in the atmosphere, or as a liquid present on the surfaces of objects deposited by spray, emersion or condensation from air.

The term "mold" as used herein means any of a large group of parasitic, saprophytic or other fungi that may cause the build-up or deposit of growth, moldiness and/or mildew, and that exist as unicellular forms (yeasts), or multicellular or other forms, such as filamentous colonies. Examples of molds include, but are not limited to, *Bacillus*, *Mucor*, *Penicillium*, *Rhizopus*, *Stachybotrys* and *Aspergillus*.

The terms "reduce," "reducing," "retard" and "retarding" as used herein in connection with the burning of a material to which a composition of the invention has previously been applied (had been applied prior to the burning of the material), or in connection with the amount or density of smoke and/or toxic gases produced by a material to which a composition of the invention had previously been applied and that is burning (had been applied prior to the burning of the material), means that: (a) the amount of burning of, flame spread over or through, and/or heat released by, the material, and/or the amount or density of smoke and/or toxic gases produced or generated by the burning material, is less than would have occurred under the same circumstances and conditions with a material that is the same, but that did not have a composition of the invention applied to it; and/or (b) the amount of time that it takes for smoldering, and/or for a flame to spread over or through the material, and/or for the material to otherwise burn, and/or for smoke and/or toxic gases to be produced or generated from the material when it is burning, is less than would have occurred under the same circumstances and conditions with a material that is the same, but that did not have a composition of the invention applied to it. Such results may be determined by methods known by those of skill in the art, such as by the various test methods set forth by the American Society for Testing and Materials, or by Underwriters Laboratories, Inc. and other similar known test methods, for example, Test Method ASTM-E84-97a, Test Method ASTME119, Test Method ASTME-84, Test Method UL 723, Test Method NFPA255, Test Method UBC8-2 or Test Method NFPA265. (For each of the foregoing flame spread, smoke development and other fire endurance tests, a rating provides guidance to an architect, builder or building code official. This permits the selection of wall, floor, ceiling and other assemblies that will potentially contain, or reduce the damage and destruction caused by, fires, allowing evacuation of building occupants to occur more safely, and potentially preventing a fire that starts in one part of a building from damaging items, or causing injuries, elsewhere in the building. The results of these tests are usually outlined in the specifications of a product, and high performance usually means that the product can be used in fire-critical applications.)

The term "spore" as used herein means a cell that is capable of developing into a mature fungus generally without fusion with another cell. Spores tend to be spherical in morphology and can range in a wide variety of colors. They are generally observed singly or in clusters.

The term "surfactant" as used herein means any compound that has the ability to reduce surface tension when dissolved or dispersed in water, or in water-based solutions or dispersions, and/or which reduces interfacial tension between two liquids, or between a liquid and a solid, and includes detergents, wetting agents and emulsifiers.

The term "textiles" as used herein means cloth, fabric, carpets and similar knitted- or woven-type materials including, but not limited to, curtains, other types of window treatments, bed coverings, carpets and carpeting.

DESCRIPTION OF PREFERRED EMBODIMENTS

In one aspect, the present invention provides a composition for application to a material comprising: (a) at least one alkaline metal inorganic salt, wherein the alkaline metal inorganic salt is present in the composition in an amount ranging from about 5% to about 45% by weight; (b) at least one potassium salt of an organic wherein the potassium salt of an organic acid is present in the composition in an amount ranging from about 1% to about 72% by weight; (c) optionally, at least one boron-containing compound, wherein the boron-containing compound is present in the composition in an amount ranging from about 0% to about 10% by weight; (d) optionally, at least one surfactant, wherein the surfactant is present in the composition in an amount ranging from about 0% to about 5% by weight; (e) optionally, at least one microbe-inhibiting compound, wherein the microbe-inhibiting compound is present in the composition in an amount ranging from about 0% to about 6% by weight; (f) optionally, at least one detection component, wherein the detection component is present in the composition in an amount ranging from about 0% to about 10% by weight; and (g) an aqueous liquid, wherein the aqueous liquid is present in the composition in an amount that brings the percent weight of the composition to 100%, wherein the composition has a pH ranging from about 7.1 to about 14, and wherein the composition, when applied to the material, reduces the amount of burning that occurs to the material, or the amount or density of smoke produced by the material, when the material is subsequently exposed to fire, and when the composition is applied to a material prior to, during or after the material being exposed to conditions favorable to the growth of microbes, reduces, inhibits or prevents the growth of microbes on the material when the material is exposed to conditions favorable to the growth of microbes.

In another aspect, the present invention provides a method for reducing the burning of, or the amount or density of smoke produced by, a material that is exposed to fire, and for inhibiting, reducing or preventing the growth of microbes on a material that is exposed to conditions favorable to the growth of microbes, comprising applying at least one application of a composition to the material prior to the material subsequently being exposed to fire, or prior to, during or after the material being exposed to conditions favorable to the growth of microbes, at a rate of about 1 gallon per from about 100 to about 1,000 square feet of the material, wherein the composition comprises: (a) at least one alkaline metal inorganic salt, wherein the alkaline metal inorganic salt is present in the composition in an amount ranging from about 5% to about 45% by weight; (b) at least one potassium salt of an organic acid, wherein the potassium salt of an organic acid is present in the composition in an amount ranging from about 1% to about 72% by weight; (c) optionally, at least one boron-containing compound, wherein the boron-containing compound is present in the composition in an amount ranging from about 0% to about 10% by weight; (d) optionally, at least one surfactant, wherein the surfactant is present in the composition in an amount ranging from about 0% to about 5% by weight; (e) optionally, at least one microbe-inhibiting compound, wherein the microbe-inhibiting compound is present in the composition in an amount ranging from about 0% to about 6% by weight; (f) optionally, at least one detection component, wherein the detection component is present in the composition in an amount ranging from about 0% to about 10% by weight; and (g) an aqueous liquid, wherein the aqueous liquid is present in the composition in an amount that brings the percent weight of the composition to 100%, wherein the composition has a pH ranging from about 7.1 to about 14.

In yet another aspect, the present invention provides a method for reducing the burning of, or the amount or density of smoke produced by, a material that is exposed to fire, and for inhibiting, reducing or preventing the growth of microbes on a material that is exposed to conditions favorable to the growth of microbes, comprising applying at least one application of a composition to the material prior to the material subsequently being exposed to fire, or prior to, during or after the material being exposed to conditions favorable to the growth of microbes, at a rate of about 1 gallon per from about 100 to about 1,000 square feet of the material, wherein the composition comprises: (a) potassium acetate, wherein the potassium acetate is present in the composition in an amount ranging from about 1% to about 72% by weight; and (b) an aqueous liquid, wherein the aqueous liquid is present in the composition in an amount that brings the percent weight of the composition to 100%; wherein the composition has a pH ranging from about 7.1 to about 14.

Compositions

The combined property, dual-action, fire retardant and mold inhibiting chemical compositions of the present invention comprise at least one alkaline metal inorganic salt, at least one potassium salt of an organic acid and an aqueous liquid. Although other components or ingredients need not be present in these compositions in order for them to be effective in retarding fire impact, or in inhibiting or preventing the growth, build-up or deposit of microbes, on materials to which they have been properly applied, these compositions optionally, but preferably, contain one or more boron-containing compounds, one or more surfactants (preferably that have the ability to promote (initiate or enhance) the penetration of other components into a material), one or more microbe-inhibiting compounds (such as mold inhibitors), and one or more detection components. The compositions of the invention may, optionally, also contain other suitable components or additives, for example, thickening agents or additional wetting agents. All of the components employed to produce the compositions of the invention are preferably compounded together to form a solution or dispersion of the chemicals in the aqueous liquid, resulting in compositions having an alkaline pH (a pH of 7.1 or higher).

The most preferred composition of the present invention contains potassium carbonate in an amount of about 25% by weight, potassium acetate in an amount of about 13% by weight, an alkaline borate compound in an amount of about 2% by weight, isodecyloxypropyl dihydroxy methyl ammonium chloride in an amount of about 0.5% by weight, and either 3-iodo-2-propynyl butyl carbamate in an amount of about 0.7% by weight or 2-pyridinethiol-1-oxide, sodium salt (sodium pyrithione) in an amount of about 0.5% by weight, with the remainder of the weight percent of the composition being water, and has a pH level above about 11.

Alkaline Metal Inorganic Salts

The compositions of the present invention contain at least one (one, two, three or more) water-soluble, alkaline metal inorganic salt that is preferably not degradable by oxygen and, thus, remains stable for an extended period of time, in an amount (combined) that is sufficient to interfere with, and thereby reduce, or completely prevent, oxidation reactions (reactions in which oxygen combines chemically with other substances), including those required for the combustion of materials. The metal radicals, such as potassium radicals, that are present in the alkaline metal inorganic salts react with the "chain carriers" OH, H and O, each of which supports the combustion process, which they remove from fire zones, thus disrupting fire reactions. In addition, carbon and oxygen atoms present in the alkali metal inorganic salts produce carbon dioxide and carbon monoxide during combustion, and retard fire propagation by interfering with the oxidation reactions. The amount of the alkaline metal inorganic salt that is present in the compositions of the invention preferably ranges from about 5% to about 45% by weight, and more preferably ranges from about 20% to about 42% by weight, and is most preferably in an amount of about 25% by weight.

The interference of the alkaline metal inorganic salt component of the compositions of the invention with oxidation reactions aids the compositions in reducing the flame spread over, and/or density or amount of smoke or toxic gases produced by, materials to which they have been applied, and that are subsequently exposed to fire. The alkaline metal inorganic salt component of the compositions of the invention also aids the compositions in inhibiting or reducing the growth, build-up or deposit of microbes, or colonies thereof, on the surfaces of materials to which they have been applied, and that are exposed to conditions favorable to the growth of microbes. The alkaline metal salts that have elevated pH properties appear to either dissolve chitin (a high molecular weight linear polypeptide of N-acetyl-D-glucosamine units linked by β-D (1→4) bonds that functions as a structural polysaccharide, and that is abundant in fungi) contained in the cell walls of microbes, such as fungal mycelia, or to dissolve lignin (a non-carbohydrate, natural binding constituent that is a complex three-dimensional polymer of phenylpropane or propylbenzene) present within fungal cell walls, each of which results in the disruption of cell wall integrity and causes cell death. It has been determined that, when cells are immersed in a solution of potassium hydroxide, the cells become cleaned (foreign matter becomes removed from the cells), shrink (as a result of dehydration) and cease to propagate. It has also been determined that glycerin can be added to the shrunken cells to prevent them from dying (being in a "crenate" condition).

Although they may be employed as alkaline metal inorganic salts in the compositions of the invention, for a variety of reasons, it is less desirable to employ sodium chloride or potassium chloride (or other halogen-containing compounds) in the compositions of the present invention in comparison with other suitable alkaline metal inorganic salts. When present under conditions of combustion, chlorine (which is present in both sodium chloride and in potassium chloride) and other halogens can produce halogen-based acid gases, such as HCl, HBr and HF, which can be toxic to humans and animals. Also, sodium present in sodium chloride may interfere with the ATP sodium-potassium "pump" that is present in fungal spores (discussed in detail hereinbelow).

Any suitable water-soluble, alkaline metal inorganic salts, which are known by those of skill in the art, and/or which are readily determined from sources known by those of skill in the art, such as Lang's Handbook of Chemistry (Thirteenth Edition, McGraw Hill Book Company, New York, 1985), may be used in the compositions of the present invention. Lang's Handbook of Chemistry lists physical constants of inorganic compounds that contain alkaline metal inorganic salts with both inorganic and organic anions. General examples of these alkaline metal inorganic salts include, but are not limited to, potassium, sodium, lithium, rubidium and cesium carbonates, sulfates, tartrates, nitrates, phosphates, gluconates, citrates, sorbates, lactates or halogens, or any combination of the foregoing. They preferably do not, however, include alkaline earth metal inorganic salts, such as magnesium, calcium, beryllium, strontium, barium, radium, scandium, yttrium, lanthanum or actinium inorganic salts. If alkaline earth metal inorganic salts are included as a component in the compositions of the invention, they should be included as an optional component in addition to the alkaline metal inorganic salts.

Specific examples of alkaline metal inorganic salts that may be used in the compositions of the present invention include, but are not limited to, potassium carbonate, potassium carbonate sesquihydrate, potassium gluconate, potassium citrate, potassium sorbate, potassium bromide, potassium chloride, potassium chromate, potassium fluoride, potassium iodide, potassium salicylate, potassium selinate, potassium silicate, potassium thioantimonate, potassium sulfide, potassium sulfate, potassium thiosulfate, potassium tartrate, potassium phosphate, sodium acetate, sodium carbonate, sodium formate, sodium sorbate, sodium sulfate, sodium tartrate, sodium nitrate, sodium phosphate, sodium gluconate, sodium citrate, sodium sorbate, lithium sulfate, lithium tartrate, lithium nitrate, lithium phosphate, rubidium acetate, rubidium carbonate, rubidium sulfate, cesium acetate, cesium sulfate or a combination of one or more of the foregoing.

Potassium carbonate ($K_2CO_3$), which can be prepared from potassium hydroxide and carbon dioxide, is a preferred alkaline metal inorganic salt for use in the compositions of the present invention, most preferably in an amount of about 25% by weight. It generally does not start to decompose into its decomposition components and, thus, have the ability to react with chain carriers to disrupt fire reactions, until it reaches its decomposition temperature. Anhydrous potassium carbonate begins to decompose at its melting point temperature of about 891° C. (1635.8° F.). However, rapid decomposition of potassium carbonate occurs at between about 500-600° C. (932-1112° F.) in the presence of water vapor, which is a product of combustion, and has an autocatalytic effect on the decomposition of potassium-based salts. These temperatures are higher than the temperatures reached in most house fires. For example, the temperature at which paper generally burns is about 204.44° C. (400° F.).

Potassium Salts of Organic Acids

The compositions of the present invention contain at least one (one, two, three or more) potassium salt of an organic acid in an amount (combined) that is sufficient to enhance (increase) the flowability of the compositions (ability of the compositions to flow), and/or enhance the solubility of one or more components of the compositions in an aqueous liquid, and/or enhance the antimicrobial properties of the compositions in comparison with compositions containing the same ingredients, and the same amounts thereof, but not containing a potassium salt of an organic acid. By decreasing the surface tension of an aqueous liquid that is present in the compositions of the invention (like a surfactant), the potassium salt of an organic acid will generally make the aqueous liquid "wetter," thus increasing the flowability of the aqueous liquid, and the spreadability of the compositions of the invention on materials to which they are applied. Such amount preferably ranges from about 1% to about 72% by weight, and more preferably ranges from about 2% to about 60% by weight (for example from about 5% to about 50% by weight), and still more preferably ranges from about 2% to about 40% by weight (for example from about 10% to about 25% by weight), and still more preferably ranges from about 8% to about 15% by weight, and is most preferably about 13% by weight.

The potassium salt of an organic acid will preferably contain from about 1 to about 6 carbon atoms, and have a high solubility in cold water (preferably about 250 grams in about 100 milliliters of water). Further, it will preferably have an alkaline pH, and have the greatest amount of cation, such as K+, available per molecular weight of the compound (to bind with the chain carriers OH, H and O).

Any suitable potassium salts of organic acids, which are known by those of skill in the art, may be used in the compositions of the present invention, including, but not limited to, potassium acetate, potassium formate, potassium tartrate, potassium citrate, potassium sorbate or potassium lactate. A preferred potassium salt of an organic acid for use in the compositions of the present invention is potassium acetate ($KC_2H_3O_2$), which is alkaline, and which is cost-effective. It is preferably employed in the compositions in an amount of about 13% by weight.

Anhydrous potassium acetate starts to decompose into its decomposition components, such as potassium gaseous compounds and carbon dioxide, each of which disrupt fire reactions, at its melting point temperature of about 292° C. (557.6° F.). However, potassium acetate starts to decompose into these components at lower temperatures when it is in the presence of water vapor, which is a product of combustion. These temperatures are significantly lower than the decomposition temperatures of potassium carbonate. As a result of the different decomposition temperatures of potassium carbonate and potassium acetate, these two compounds act synergistically in a composition of the invention that contains both of these compounds. Such a composition will have "time release" fire fighting properties, with the potassium and carbon dioxide fire blocking elements advantageously being rapidly released from the decomposing potassium acetate when a flame or fire reaches a temperature lower than 292° C. (557.6° F.), and with the decomposition products released from the decomposing potassium carbonate having the ability to disrupt fire reactions at a later time (when the flame or fire reaches a temperature of about 500-600° C. (932-1112° F.)).

The utilization of different alkali metal inorganic salts and potassium salts of organic acids (having different decomposition temperatures) in the compositions of the present invention can provide these compositions with a "time release" mechanism for the elements of decomposition, resulting in a "sustained release" of these decomposition elements from the compositions. This phenomenon occurs as a result of the differential in the decomposition temperatures of the various salts that can be combined within the compositions.

Boron-Containing Compounds

The compositions of the present invention optionally, but preferably, contain at least one (one, two, three or more) boron-containing compound in an amount (combined) that is sufficient to inhibit or reduce the growth, build-up or deposit of microbes, or colonies thereof, on materials to which the compositions have been applied, and/or to enhance (increase) the ability of materials to which the compositions have been applied to reduce the spread of flame, and/or the amount or density of smoke or toxic gases produced, when the materials are exposed to fire, in comparison with compositions containing the same ingredients, and the same amounts thereof, but not containing a boron-containing compound. Such amount preferably ranges from about 0% to about 10% by weight, and more preferably ranges from about 0.1% to about 10% by weight, and still more preferably ranges from about 0.4% to about 8% by weight, and still more preferably ranges from about 1% to about 6% by weight, and even more preferably ranges from about 1% to about 4% by weight, and is most preferably about 2% by weight.

Any suitable boron-containing compounds, which are known by those of skill in the art, may be used in, or to produce, the compositions of the present invention, including, but not limited to, ammonium, sodium, potassium and calcium borates (ammonium borate, sodium borate (borax, $Na_2B_4C_7$), potassium borate and calcium borate) and boric acid. However, a preferred boron-containing compound for use in the production of the compositions of the present invention is boric acid, which reacts with components present in the potassium-containing alkaline compositions to produce a potassium borate compound, such as potassium tetraborate or potassium pentaborate, that becomes present in the compositions at a pH level of about 11 or higher, and that is preferably employed in the compositions in an amount of about 2% by weight.

The boron-containing compounds appear to have two different effects when included as a component of the compositions of the invention. They appear to inhibit or reduce the growth, build-up or deposit of microbes on, and promote the fire retardancy of, materials to which the compositions of the invention have been applied. In addition, boron-containing compounds may function as a "detection component" (discussed hereinbelow).

Surfactants

The compositions of the present invention optionally, but preferably, contain at least one (one, two, three or more) surfactant in an amount (combined) that is sufficient to enhance the ability of the compositions, and the components contained therein, to disperse into the matrix of a substrate to generally form a dry film coating on the material to which the compositions are applied in comparison with compositions containing the same ingredients, and the same amounts thereof, but not containing a surfactant. Such amount preferably ranges from about 0% to about 5% by weight, and more preferably ranges from about 0.1% to about 5% by weight, and still more preferably ranges from about 0.3% to about 3% by weight, and most preferably ranges from about 0.5% to about 0.7% by weight, with about 0.5% by weight being most preferred.

The surfactant that is optionally employed in the compositions of the present invention preferably has the ability to reduce the interfacial tension between a solid and a liquid, or between two liquids, and to aid other components present in the compositions to more adequately disperse onto or into the surface of the material to which the compositions are applied, and is added to the aqueous compositions to provide more effective dry film (or other) coating properties to the compositions. The surfactant can be a cationic surfactant, a nonionic surfactant or an amphoteric surfactant, but is preferably a cationic or amphoteric surfactant, and is most preferably an amphoteric surfactant.

Any suitable surfactants, which are known by those of skill in the art, may be used in the compositions of the present invention, including, but not limited to, isodecyloxypropyl dihydroxy methyl ammonium chloride, cetyl trimethyl ammonium bromide, telomer B monoether, alkyl imino acid, monosodium salt, B-alanine, N-(2-carboxyethyl)-N-3 decyloxy propyl monosodium salt (also known as isodecyloxypropyliminodipropionic acid monosodium salt), ethoxylated C9-C11 alcohols, straight line linear primary alcohol ethoxalates, water soluble poly(3) (5 or 7 or 9) oxyethelene C11 alcohols, such as Neodol 25-7 or Neodol 25-9, water soluble straight line secondary alcohol ethoxalates, such as alkyloxypolyethoxeneoxyethanol or Tergitol 15-S-7 (7 mol), Nonylphenol (a polyethanlene glycol ether), NP-9 Ethoxalted nonylphenol, Octyphenol, and the commercially-available surfactants that are described in *Emulsifiers & Detergents*, Vol. I (McCutcheon, 2002).

Preferred surfactants for use in the compositions of the present invention are isodecyloxypropyl dihydroxy methyl ammonium chloride and B-alanine, N-(2-carboxyethyl)-N-3 decyloxy propyl monosodium salt, with isodecyloxypropyl dihydroxy methyl ammonium chloride being most preferred, and preferably being employed in the compositions in an amount of about 0.5% by weight.

Microbe-Inhibiting Compounds

The compositions of the present invention optionally, but preferably, contain at least one (one, two, three or more) microbe-inhibiting compound in an amount (combined) that is sufficient to enhance the ability of the compositions to inhibit, reduce or prevent the growth, build-up or deposit of microbes, or colonies thereof, on materials to which they have been applied when they are exposed to conditions favorable to the growth of microbes in comparison with compositions containing the same ingredients, and the same amounts thereof, but not containing a microbe-inhibiting compound. Such amount preferably ranges from about 0% to about 6% by weight, and more preferably ranges from about 0.1% to about 6% by weight, and still more preferably ranges from about 0.1% to about 3% by weight, and still more preferably ranges from about 0.4% to about 0.9% by weight, and most preferably is about 0.7% by weight for 3-iodo-2-propynyl butyl carbamate and is about 0.5% by weight for 2-pyridinethiol-1-oxide, sodium salt (sodium pyrithione).

It has been determined that the microbe-inhibiting compound, when present in the compositions of the invention, advantageously and unexpectedly acts synergistically with each of the other components present in the compositions that have antimicrobial properties (that have the ability to inhibit the growth, build-up or deposit of microbes on materials to which they have been applied once they are exposed to conditions favorable to the growth of microbes), such as the alkaline metal inorganic salt, the potassium salt of an organic acid and the boron-containing compound. As a result, and as can be seen from the experiments described in the "Examples" section set forth hereinbelow, the ability of the compositions of the invention to inhibit the growth, build-up or deposit of microbes, or colonies thereof, on materials to which they have been applied once they are exposed to conditions favorable to the growth of microbes is greater (generally resulting in 100% effectiveness, with no microbial growth, build-up or deposit whatsoever) than the ability of compositions that contain the same ingredients, and the same amounts thereof, but contain: (a) the microbe-inhibiting compound alone (without an alkaline metal inorganic salt, a potassium salt of an organic acid or a boron-containing compound); (b) an alkaline metal inorganic salt in the absence of a microbe-inhibiting compound; (c) a potassium salt of an organic acid in the absence of a microbe-inhibiting compound; or (d) a boron-containing compound in the absence of a microbe-inhibiting compound. Also as a result, a significantly lower concentration of a microbe-inhibiting compound than the amount recommended by its manufacturer may generally be employed in the compositions of the invention. The microbe-inhibiting compound appears to enhance the antimicrobial effects of the alkaline metal inorganic salt, the potassium salt of an organic acid and the boron-containing compound. The synergistic effect produced by the microbe-inhibiting compound in combination with one or more of these other components generally results in a longer period of protection, and a more complete protection, against microbes, or colonies thereof, being grown, built-up or deposited on materials to which compositions of the invention containing the synergistic components have been applied.

Any suitable microbe-inhibiting compounds, which are known by those of skill in the art, may be used in the compositions of the present invention, including, but not limited to, 2-pyridinethiol-1-oxide, sodium salt (sodium pyrithione), 3-iodo-2-propynyl butyl carbamate, disodium cyanoditholmidocarbonate, potassium N-methyldithiocarbamate, ammonium salts of alkylated phosphoric acids, such as ethanol, 2,2'-(cocoimino)-bis, salt with phosphoric acid, bis (2-ethylhexyl ester (1:1), ethanol, 2,2'-(cocoimino)-bis, salt with phosphoric acid, mono (2-ethylhexyl) ester (1:1), or phosphoric acid, mono (2-ethylhexyl) ester, bis(tri-N-butylin)oxide, chlorinated phenols, such as ortho-phenyl phenol, potassium iodide, ammonium iodide, potassium iodate, ammonium iodate, 10-10 oxybisphenoxyarsine, octadecyl.n-odim.ethyltrihydroxy silypropyl ammonium chloride, 3-(trimethoxysilyl) propyloctadecyldimethyl ammonium chloride and the Intersept® fungistat and bacteriostat (a phosphated quaternary amine complex that is a broad-spectrum fungistat and bacteriostat, that is registered with the EPA under EPA Registration Number 43670-01, that is discussed in U.S. Pat. No. 4,935,232 and that may be obtained from Interface Research Corporation (Kennesaw, Ga.)). The microbe-inhibiting compounds employed in the compositions of the present invention are preferably commercial antimicrobial inhibiting compounds that are registered with the EPA.

At the pH levels described herein, compositions of the invention that contain the microbe-inhibiting compound 2-pyridinethiol-1-oxide, sodium salt (sodium pyrithione), which is water soluble, form a true solution that remains homogeneous (does not have components separate out) and stable indefinitely and, thus, that advantageously need not be mixed or agitated prior to an application to a material. Thus, a preferred microbe-inhibiting compound for use in the compositions of the present invention, when mixing or agitation of the compositions prior to an application to a material is not desirable, is 2-pyridinethiol-1-oxide, sodium salt (sodium pyrithione), which is available from ARCH Chemical, Inc. (Cheshire, Conn.), as a 40% by weight solution, and which is preferably employed in the compositions in an amount of about 0.5% by weight.

At the pH levels described herein, compositions of the invention that contain the microbe-inhibiting compound 3-iodo-2-propynyl butyl carbamate form a dispersion that generally needs to be mixed or agitated prior to an application to a material. Thus, a preferred microbe-inhibiting compound for use in the compositions of the present invention, when mixing or agitation of the compositions prior to an application to a material is desirable, is 3-iodo-2-propynyl butyl carbamate, which is available from Troy Chemical Corporation (Newark, N.J.), and which is preferably employed in the compositions in an amount of about 0.7% by weight.

Because time and application steps will generally be reduced if compositions of the invention do not need to be mixed or agitated prior to an application to a material, it will often be preferable to employ 2-pyridinethiol-1-oxide, sodium salt (sodium pyrithione) in the compositions of the invention. However, if one or more thickening agents, such as one or more polymers, is included in the compositions of the invention, it will generally be preferable to mix or agitate the compositions prior to an application to a material. Under these circumstances, it will generally be preferably to employ 3-iodo-2-propynyl butyl carbamate as the microbe-inhibiting compound in the compositions.

When preparing the compositions of the invention, rather than using a dry form of a microbe-inhibiting compound (one that is not dissolved in, or mixed with, a liquid), it may be preferable to use a microbe-inhibiting compound that is present in an organic solvent, such as a propylene glycol solvent or a glycol ether solvent. Glycol ether solvents that may be used for this purpose include propylene glycol monomethyl ethers, such as Poly Solve MPM (also known as Poly Solve PM), diethylene glycol monomethyl ether (Poly Solve DM), dipropylene glycol monomethyl ether (Poly Solve DPM) and ethylene glycol monobutyl ether (Poly Solve EB). For example, it is preferable to use 3-iodo-2-propynyl butyl carbamate dissolved in a glycol ether solvent, rather than in a dry form. Poly Solve MPM is a preferred solvent for use because of its beneficial solubility, safety and effectiveness properties.

If a microbe-inhibiting compound to be employed in a composition of the invention is present in a solvent or other liquid (rather than in a dry form), the weight percent of the aqueous liquid present in the composition should then be adjusted downward in the amount of the weight percent of the solvent or other liquid added to the composition. For example, if an aqueous liquid was to be present in a composition of the invention in an amount of 50% by weight, but 1% by weight of an organic solvent is added to the composition as a result of a microbe-inhibiting compound being present therein, the weight percent of the aqueous liquid should be adjusted downward in the amount of 1% by weight, so that the weight percent of the aqueous liquid will be 49%. Once the composition of the invention dries on a material to which it has been applied, both the aqueous liquid and the organic solvent (or other liquid) will have evaporated, will have been adsorbed into the material or will have otherwise disappeared, leaving only the active ingredients of the composition as salts at or on the surface of the treated material.

In the examples set forth hereinbelow, it was found that Gypsum Wall Board samples to which a fire retardant and microbe-inhibiting composition of the invention that did not contain a microbe-inhibiting compound (a fungal resistant mold inhibitor) was applied resulted in sparse fungal colonization when the material was subsequently exposed to conditions favorable to the growth of microbes. However, when various mold inhibiting compounds were added to the fire retardant and mold inhibiting composition, no fungal colonization resulted. In stark contrast, untreated Gypsum Wall Board samples showed dense fungal colonization.

Detection Component

The compositions of the present invention optionally, but preferably, contain at least one (one, two, three or more) detection component, such as a tracer, in an amount (combined) that is sufficient to permit a determination by one or more detection processes before or after a material has been exposed to flame or fire (or other burning), or to conditions favorable to the growth of microbes, of whether or not a composition of the invention had been applied to the material prior to the material being exposed to the flame or fire (or other burning), or to conditions favorable to the growth of microbes, and if so, whether the composition had been applied to the material properly. Such amount generally ranges from about 0% by weight to about 10% by weight, and preferably ranges from about 0.01% by weight to about 10% by weight, and more preferably ranges from about 0.01% by weight to about 3% by weight, and still more preferably ranges from about 0.1% by weight to about 2% by weight, with about 0.7% by weight being most preferred.

By gamma irradiation processes that can be performed by commercial neutron activation analysis laboratories, such as Ecole Polytechnique (Montreal, Canada), or by other neutron activation methods, or by other detection methods known by those of skill in the art, it is possible to determine "after the fact" (after the partial or complete burning of a material, or after the growth, build-up or deposit of microbes on the material, even several years later) from even severely-damaged or completely-destroyed material (as well as from less damaged material), such as ash remaining from a material that has been completely burned, whether or not the material had been treated with a composition of the present invention prior to the material being exposed to fire, or to conditions favorable to the growth of microbes, and if so, whether or not the composition had been applied to the material properly. This "signature" or "fingerprinting" feature of the compositions of the invention is quite advantageous because it can render invalid claims made by others that a composition of the invention failed to work under circumstances in which the composition had never been applied to a tested material at all, or had been applied to the tested material improperly.

When, for example, Ecole Polytechnique gamma irradiation processes are employed for this purpose in connection with a material to which a composition of the invention containing the detection component 3-iodo-2-propynyl butyl carbamate has been applied, a sample of the material to be analyzed, such as some of the ash resulting from material that had been burned, is placed into an irradiation vial. The sample will preferably be at least about 10 mm×10 mm×1 mm in size. The entire sample is then irradiated in the neutron flux present in a nuclear reactor. A known fraction of the iodine atoms present in the 3-iodo-2-propynyl butyl carbamate will capture neutrons, and will be converted to radioactive 1-128, which emits gamma rays of energy 442 keV. The sample is then removed from the nuclear reactor and placed on a germanium semiconductor gamma-ray detector connected to a multichannel analyzer. The number of gamma rays detected at the energy 442 KeV, corrected for background interferences, is proportional to the total amount of iodine present in the sample. The amount of iodine present in the sample is calculated by comparing it with a known standard. The resulting amount is divided by the known surface area of the sample to provide the surface concentration in μg/cm$^2$. The 3-iodo-2-propynyl butyl carbamate concentration is obtained by dividing the iodine concentration by the iodine fraction in the 3-iodo-2-propynyl butyl carbamate molecule. The contribution from iodine that may naturally be present in the material can be verified and corrected for, if necessary, by analyzing a sample of the material that has not been treated with the composition of the invention.

Suitable detection components that may be employed in the compositions of the present invention include, but are not limited to, 3-iodo-2-propynyl butyl carbamate (which can function both as a microbe-inhibiting compound and as a detection component in the compositions of the invention), zirconia (the oxide of zirconium), selenium dioxide, zirconium acetate, boron-containing compounds (compounds that contain the element boron, such as potassium tetraborate and potassium pentaborate) and other detection components known by those of skill in the art. A preferred detection component for use in the compositions of the invention is 3-iodo-2-propynyl butyl carbamate, which is preferably employed in the compositions in an amount of 0.7% by weight. When 3-iodo-2-propynyl butyl carbamate or the other detection components described above are not employed in the compositions of the invention, boron molecules present in potassium borate salts present in the compositions will generally be employed as a detection component. Boron generally remains present in ash that is produced from a material that has been exposed to flame or fire (or other burning). Standard chemical analysis techniques known by those of skill in the art may be employed to detect the presence of boron in such ash.

Aqueous Liquid

The compositions of the present invention contain an aqueous liquid in an amount that will bring the weight percent of the compositions to 100% after adding the weight percents of all of the other components and ingredients present in the compositions, including the weight percent of the liquid containing a microbe-inhibiting compound when a microbe-inhibiting compound is employed in the compositions, and is present in a liquid (rather than in a dry form). The amount of aqueous liquid that is employed in the compositions of the invention preferably ranges from about 4% to about 95% by weight, and more preferably ranges from about 25% to about 75% by weight, and most preferably is in an amount of about 48.5% by weight.

The aqueous liquid acts as a diluent that aids in the application and spreading of the compositions of the invention over the surfaces of materials, and preferably contains from about 10% to about 100% water, and more preferably contains from about 50% to about 100% water, and still more preferably contains from about 80% to about 100% water, and most preferably contains 100% water. The water employed may be tap, deionized, distilled or otherwise purified water, all of which are inexpensive and non-hazardous.

A wide variety of known aqueous liquids may be employed in the compositions of the invention, as will be recognized by those of skill in the art.

Other Optional Components or Additives

Other components or additives, such as coloring agents, thickening agents, agents that provide enhanced "wetting" qualities or enhanced bonding properties, or agents that promote a pleasant odor, may also, optionally, be employed in the compositions of the invention in suitable amounts, which may be determined by those of skill in the art.

Depending upon the particular material to which a composition of the invention is to be applied, or whether or not its surfaces contain one or more coats of Latex or other paint, it may be desirable to add a suitable amount of a thickening agent, or of a wetting agent, to the composition (to increase or decrease the viscosity of the composition). For example, ceiling tiles tend to soak liquid up in a manner similar to that of a sponge, whereas dry wall does not (liquid tends to bead up on the surfaces of dry wall). Thus, it may be desirable to increase the viscosity of a composition of the invention that is applied to ceiling tiles in comparison with the viscosity of a composition that is applied to dry wall. The viscosity of the compositions of the invention may be readily altered in a manner known by those of skill in the art for application to a wide variety of materials, with an optimal viscosity for a particular material depending upon the type and amount of porosity that is present on the surfaces of the material, or the need or desirability of enhancing the bonding of dried salts to one or more surfaces of the materials, for example, by the addition of bonding agents, such as polymers.

pH Level

Because the fire retardancy and/or microbe inhibition properties of the compositions of the present invention may be significantly reduced at neutral or acidic pH levels, the compositions of the invention should have a pH level that preferably ranges from about 7.1 to about 14, and that is more preferably above about 11. The pH level of the compositions can be measured by a pH meter in a manner known by those of skill in the art.

Modes of Action

The chemical components present in a composition of the invention that has been applied to a material will generally remain dormant until one or the other of two situations occur, which likely will not occur simultaneously, or even near the same time (because the conditions that promote one situation are generally quite different, or opposite, from the conditions that promote the other situation): (a) the material becomes exposed to fire; or (b) the material becomes exposed to conditions favorable to the growth of microbes. During the period of time in which these chemical components remain dormant on the material, it is as though the material has present on its surfaces at all times both a series of fire extinguishers, and a series of ultraviolet rays, just waiting to be employed.

Spores or cells of microbes, such as mold, are omnipresent in the air. Generally, under conditions that are favorable to the growth of microbes, spores or cells of microbes will develop into cell conida.

The potassium ion ($K^+$) is the most common intracellular cation, and is essential for maintaining osmotic pressure and electrodynamic cellular properties in organisms. It acts as an osmotically active material that builds up internal (turgor)

pressure. The intracellular potassium ion concentrations are typically high for most cells, whereas the extracellular potassium ion concentrations are generally significantly lower. In contrast, the intracellular concentrations of the sodium ion ($Na^+$) are generally lower than the extracellular sodium ion concentrations. An enzyme called sodium-potassium-ATPase has been isolated in the microsomal, or membrane fraction, of many tissues that transport sodium, such as the phospholipid-protein complex membrane of the cellulite material surrounding fungal spores or cells. An ATP sodium-potassium "pump" that is present in fungal spores or cells appears to permit the ejection of $Na^+$ ions from the spores or cells, and simultaneously permit the injection of $K^+$ ions into the spores or cells. An osmotic gradient between the spores or cells and their surrounding environment appears to be created when the spores or cells are in a healthy condition, and the osmotic pressure difference across the spore or cell membranes provides a force oriented to drive water from the exterior to the interior of the spores or cells. Water appears to penetrate into the spores or cells until the internal pressure is sufficient to stop the flow. If, however, the environment is imbalanced in a manner that an excess of potassium ions is present, the cell walls cannot prevent the entrance of more potassium than they can accommodate in balance.

The cell walls of many microbes form a barrier against deleterious environmental influences. Fungi and yeasts that have a chitin content in their cell walls generally include zygomycetes, ascomycetes, plectomycetes, atreptomycetes, pyrenomycetes, discomycetes and yeasts, and specifically include *Stachybotrys* species, *Aspergillus* species, *Penicillium* species, *Mucor* species, *Phycomyces* species, *Choanephora* species, *Zygonhynchus* species, *Blakesiia* species, *Actinomyces* species and *Saccharomyces* species.

With respect to their ability to inhibit the growth, build-up or deposit of microbes, or colonies thereof, on a material, the chemical components present in the compositions of the present invention, after being applied to a material, appear to remain dormant until such time that conditions become favorable to the growth of microbes, for example, conditions of temperature, humidity and/or food source that are favorable to the development of cell conida from microbial spores or cells. Once the conditions of, or around, the material become favorable to the growth of microbes by, for example, the addition of moisture, the chemical components present in the compositions of the invention no longer remain dormant, but become active. The new conditions cause the chemical components present in the compositions to release ions that inhibit the development of cell conida from spores or cells by promoting an environment in which the spores or cells cannot develop into cell conida. The ions appear to cause the ATP sodium-potassium "pump" present in the phospholipid-protein complex membrane of the cellulite material surrounding the spores or cells to malfunction, depleting the sodium present in the spores or cells, causing the osmotic pressure in the spores or cells to be significantly reduced, and the spores or cells to shrink (as a result of dehydration) and collapse (crenate). The ATP sodium-potassium pump appears to pump the spores or cells to death, thereby killing the spores or cells. This process works in a manner similar to that of a "landmine." The chemical components present in the compositions of the invention sit and wait to be activated (by the addition of conditions favorable to the growth of microbes, such as moisture).

It is believed that the pH level of the compositions of the present invention, and potassium compounds that are present in the compositions, each contribute to the ability of the compositions to inhibit the growth, build-up or deposit of microbes, or colonies thereof, on materials to which the compositions have been applied. While not wishing to be bound by any theory, it is believed that a high pH may adversely affect microbes, such as mold, by dissolving one of the following cell wall components, thereby disrupting cell wall integrity and causing cell death: (a) lignin present in the cell walls of cells that develop from spores or cells; or (b) chitin contained in cell walls of microbe mycelia.

In contrast with the ions that are released from the chemical components present in the compositions of the invention upon the exposure of a material having the compositions applied thereto to conditions favorable to the growth of microbes, which adversely affect the spores or cells of the microbes, the pH of the compositions appears to adversely affect cells that have been able to develop from the spores. Thus, the ions released from the chemical components present in the compositions appear to provide a first mode of inhibition of the growth, build-up or deposit of microbes on a material, while the pH of the compositions appears to provide a second mode of inhibition.

Similarly, the fire retarding properties of the compositions of the present invention remain dormant, and do not become activated, until a material to which the compositions have been previously applied is exposed to conditions of fire, flame, combustion or other burning. When the temperature of the material, however, becomes elevated, for example, to flame temperature, the combustion of the material causes ions to be released from components present in the compositions of the invention, and these ions interfere with oxidation by combining with the chain carriers (OH, H and O) present in the ambient surroundings, rendering the chain carrier molecules unavailable to support the combustion process. This process results in an increase in the amount of carbon-char that is produced in or on the material, a reduction in the amount of burning that occurs to the material, a reduction in the flame spread over the material, a reduction in the amount of heat released from the material, a reduction in the amount or density of smoke produced by the material and/or a reduction in the amount of toxic gases produced by the material. The minimum temperature of the material at which ions will be released from components present in the compositions of the invention will vary depending upon the type and composition of the material, the airflow present around the material, the moisture content of the material, the other combustionable products that are in proximity with the material (if any) and like considerations, and may readily be determined by those of skill in the art.

Methods of Preparation

It is preferable that the components of the compositions of the invention are mixed or otherwise agitated together at ambient temperature for a sufficient time to cause the components to become dissolved in an aqueous liquid, forming an aqueous solution. Any suitable mixing equipment or methods may be used to mix the components of the compositions together to form a solution, such as stirring with a suitable utensil or apparatus.

The compositions of the present invention are preferably prepared at a temperature ranging from about 33° F. to about 211° F., and more preferably at ambient temperature, and at a pressure ranging from about 0.5 to about 3 atmospheres, and more preferably at ambient pressure.

When preparing the compositions of the invention in a laboratory, it is preferable to first add the alkaline metal inorganic salt to the aqueous liquid, and to agitate these two components together with, for example, a laboratory magnetic stirrer (or other suitable equipment known by those of skill in the art) until a solution is formed, which generally requires at least about 2 minutes, and which usually requires about 20 minutes. It is then preferable to add the potassium salt of the organic acid to the solution formed in the preceding step with agitation until a solution is again achieved, which generally requires at least about 1 second, and which usually requires about 10 minutes. If a boron-containing compound is employed in the compositions, it is then preferable to add the boron-containing compound to the solution formed in the preceding step with agitation until a solution is again achieved, which generally requires at least about 2 minutes, and which usually requires about 20 minutes. If a microbe-inhibiting compound is employed in the compositions, it is preferable to add this compound to the solution formed in the preceding step with agitation until complete dispersion is achieved, which generally requires at least about 2 minutes, and which usually requires about 10 minutes. If a surfactant is employed in the compositions, it is preferable to add the surfactant to the mixture formed in the preceding step with agitation until it becomes thoroughly mixed with the other components of the compositions, which generally requires at least about 30 seconds, and which usually requires about 3 minutes. If a detection component is employed in the compositions, and if it is different from the microbe-inhibiting compound, it is preferable to add the detection component to the mixture formed in the preceding step in a finely-divided form with agitation until it becomes thoroughly mixed with the other components of the composition, which generally requires at least about 1 minute.

Those of ordinary skill in the art will recognize that the times described in the preceding paragraph may vary depending upon the particular mixing equipment employed, the rate of agitation employed, the temperature of the aqueous liquid employed and the sizes of the grains of the various dry components employed. Those of skill in the art will also recognize that other methods may be utilized to prepare the compositions of the present invention, and that the temperatures, pressures, times and order of steps employed in preparing the compositions may be varied. Further, in the case in which the manufacturer of a particular component employed in the compositions of the invention provides recommendations regarding the use of the component, it is generally preferred that these recommendations be followed. Using the information provided herein, those of ordinary skill in the art will also readily be able to manufacture the compositions of the invention in bulk quantities.

Compositions of the invention may usually be stored in suitable containers, such as plastic containers, indefinitely prior to use under reasonable conditions (situations in which no intense heat, or intense cold, or like unusual conditions are present). If 2-pyridinethiol-1-oxide, sodium salt (sodium pyrithione) is employed as a microbe-inhibiting compound in the compositions of the invention, it will generally not be necessary to mix or agitate the compositions, which should be in the form of solutions, prior to applying the compositions to materials. If, however, 2-pyridinethiol-1-oxide, sodium salt (sodium pyrithione) is not employed in the compositions of the invention as a microbe-inhibiting compound, the compositions of the invention will often be in the form of dispersions. In this case, in order to achieve the most beneficial and uniform distribution of active components within the compositions of the invention in, or over, materials to which they are applied, it will be preferable that the compositions be in the form of a homogeneous dispersion when they are applied to the materials (that components within the compositions are not separated out of the dispersion). This may be achieved, for example, by shaking or otherwise agitating the compositions, by mixing the compositions, or by other methods known by those of skill in the art, just prior to applying the compositions to materials.

Methods of Use

While not necessary, it is preferable that materials to which the compositions of the invention are applied have an ability to "accept" the compositions (permit the compositions to partially or fully penetrate one or more surfaces of the materials). It is, thus, preferable that one or more surfaces of such materials have at least some porosity (be at least somewhat porous). Additionally, or alternatively, the bonding of the active ingredients present in the compositions of the invention to the surfaces of materials can be enhanced by an addition of one or more polymers to the compositions. Such polymers include, for example, Aqua-Resin L (R.L. Lucas, Inc., New York, N.Y.), ChemCor 521N-30 (ChemCor, Chester, N.Y.), Polycote 30 (Eka Chemicals, Marietta, Ga.), Fabritone MC-30 (Noveon, Cleveland, Ohio), Uniol PEL (Kunal Org., Pvt., Ltd. GB) and Berchem 4,000 (Berchem, Inc., Cranston, R.I.). The amount (combined) of the one or more polymers that may be employed in the compositions of the invention preferably ranges from about 0.5% to about 5% by weight, and is more preferably about 2% by weight of a 30% emulsion. It is preferable that the one or more polymers be added as a final step in the preparation of the compositions of the invention because the polymers often cause the compositions to become cloudy, rendering it difficult or impossible to visually determine whether or not soluble components present in the compositions have dissolved.

Improved methods for providing flame retardant and microbe inhibiting properties to a material, such as new construction, non-coated, production run Gypsum Wall Board, or Gypsum Wall Board that has been previously painted, and that is to be refinished or rehabilitated by additional painting, can generally be achieved by applying at least one (one, two, three, four, five, six, seven, eight, nine, ten or more) molecular layer of a combined property, dual-action, fire retardant and microbe inhibiting composition of the invention to one or more of the surfaces of the material prior to the material being exposed to fire, or prior to, during or after the material being exposed to conditions favorable to the growth of microbes, at ambient temperature and pressure. Alternatively, or in addition, the composition of the invention may be added to, or mixed with, the material during the manufacture or other production of the material (if the components of the composition of the invention and the components of the material are determined to be compatible, which determination may be made using standard methods known by those of skill in the art). Elevated or reduced temperatures and/or pressures are not necessary when carrying out the methods of the invention.

The application of at least one molecular layer of a composition of the invention to one or more surfaces of a material may generally be achieved by applying at least one (one, two, three, four, five, six, seven, eight, nine, ten or more) treatment or application of the composition to one or more of the surfaces of the material, or to components thereof, such as to both sides of the paper binding present on both the front side and on the back side of Gypsum Wall Board, prior to the material being exposed to fire, or prior to, during or after the material being exposed to conditions favorable to the growth of microbes, at the rate of from about 1 gallon per from about 100 to about 1,000 square feet of material per treatment or application, and more preferably at the rate of from about 1 gallon per from about 300 to about 700 square feet of material per treatment or application. A preferred rate of application of the compositions of the invention to a material is the application of 2 treatments of the composition to the material, each treatment at an application rate of about 1 gallon per from about 300 to about 700 square feet of material. A more preferred rate of application is the application of 2 treatments of the composition to the material, each treatment at an application rate of about 1 gallon per about 700 square feet of a material.

Many tests have been conducted in which compositions of the invention were applied to a material at various rates, particularly at the rate of about 1 gallon per from about 250 to about 750 square feet of material, using both single and multiple treatments. From these tests, it has been determined that the application rate employed with a particular material usually depends upon the surface characteristics of the material, as well as upon the economic feasibility of the treatments. Those of ordinary skill in the art will readily be able to determine the surface characteristics of a particular material (or portion of the material), such as the level of porosity, and an optimum application rate for that material (or portion of the material).

Gypsum Wall Board, for example, generally contains a front side (a front, finished-paper side that has paper bound to its surface, and that would be exposed if the dry wall was installed in a building) and a back side (a back side that has Kraft paper bound to its surface, and that would not be exposed if the dry wall was installed in a building). The back side of Gypsum Wall Board has a surface that is generally poorly sealed with a composition that contains minimal amounts of solid fillers, such as clay and/or calcium carbonate. Thus, this surface of the board tends to absorb the fluid compositions of the invention much more readily, and to a deeper depth, than the paper encased surface present on the front side of the board. The front side of Gypsum Wall Board is covered with a much thinner, but tighter, surface paper that contains more fillers than are present on the back side of the board, and that resist wetting to a greater degree than the back side of the board. The paper present on the front side of Gypsum Wall Board is smoother, and has much less porosity and permeability than the paper present on the back side of the board. This may allow for a greater area of treatment for the front side of Gypsum Wall Board for the same volume of liquid composition of the invention in comparison with the back side of the Gypsum Wall Board.

Wood surfaces, such as the surfaces of "OSB" pine, high grade plywood, wood wall supports and studs, show much the same variations as Gypsum Wall Board in the tightness of the surfaces thereof, often resulting in a resistance to penetration and wetting by liquid compositions. However, these surfaces have been treated in an effective manner with compositions of the present invention at the rate of about 1 gallon per from about 100 to about 1,000 square feet of wood per treatment, and more preferably at the rate of about 1 gallon per from about 300 to about 700 square feet of wood per treatment. Preferably, at least two applications of the composition are applied to the wood surfaces.

Persons of ordinary skill in the art are familiar with the different types of surfaces that are present on different materials, and with their different porosity characteristics and other properties, and will know how to vary the rate of the application of a composition of the present invention to a material, and the number of applications of the composition to the material, in a manner that will ensure that the composition is effectively applied to the material (that the material will have the beneficial flame retardancy and microbe inhibition properties described herein).

Compositions of the invention may be applied to new, untreated materials, or to existing materials during retrofit or renovation projects in which the materials must be treated in place.

Compositions of the invention may be applied sequentially in a series of multiple applications, or prior to, in between and/or after the application of one or more coats of paint (or other coatings) to a material. While it is not necessary, prior to using a material to which a composition of the invention has been applied, or prior to applying an additional application or treatment of a composition of the invention to a material, or prior to applying a coat of paint (or other coating) to a material to which a composition of the invention has been applied, it is preferable to permit the composition of the invention to remain on the material for at least a period of time until no liquid is any longer observed standing on the surface of the material (until the material no longer appears to be wet, even though it may feel damp to the touch, which will generally occur when the reflection of light on the surface of the material is diminished in comparison to the reflection of light that was present on the surface of the material when the composition of the invention was first applied to the material). This condition will generally occur at ambient temperature and ambient pressure in a period of time ranging from about 1 to about 20 minutes, and will more usually occur in a period of time ranging from about 2 to about 10 minutes, but may vary depending upon the particular composition applied to the material, the particular paint or other coating applied to the material (if any), and the surface and other characteristics of the particular material to which the composition is applied, and can readily be determined by persons of ordinary skill in the art. Elevated or reduced temperatures and/or pressures are not required for this condition to occur (i.e. it can occur at ambient temperature and ambient pressure). Usually, it will take a longer period of time for the first application or treatment of a composition of the invention to no longer appear to be wet on a material to which it has been applied in comparison with subsequent applications or treatments of the same composition to the same material. It has been determined that the first application or treatment of a composition of the invention to the surface of a material, such as Gypsum Wall Board, appears to form ion exchange or osmotic channels in the material, and that these ion exchange or osmotic channels tend to draw subsequent applications of the composition more rapidly into portions of the material that are not porous enough to permit the flow of a liquid, such as water. This process is like that of "sap" rising upwards in a tree. The ion exchange or osmotic channels are already formed by the time that subsequent applications or treatments of the composition are applied to the material, and need not be formed again by additional applications or treatments of the composition to the material.

When a composition of the invention is applied over the surface of a material to which a coat of paint (or other coating), such as a primer, has recently been applied, the coat of paint (or other coating) should preferably be permitted to dry for a period of time until it becomes poorly reflective (no longer reflects light intensely), which generally occurs in a period of time ranging from about 1 to about 30 minutes, and more usually occurs in a period of time ranging from about 5 to about 15 minutes. However, as is known by those of skill in the art, this amount of time may vary depending upon the type of paint (or other coating) employed, the thickness of the paint applied, the particular material to which the paint is applied and like considerations.

When a composition of the invention is added to a material during its manufacture or other production, a sufficient amount of the composition should be added to the material to achieve the same distribution of the composition on one or more of the surfaces of the material as would be achieved if the composition was applied to one or more of the surfaces of the material at the rate of from about 1 gallon per from about 100 to about 1,000 square feet of material per treatment. This amount will vary depending upon the type of material being manufactured, the amount of material being manufactured, the surface area present on the material after it has been manufactured and like considerations. However, this amount may readily be determined by persons of ordinary skill in the art.

Once an aqueous composition of the invention has been dispersed and dries on a material to which it has been applied, the chemical compounds that were present in the aqueous dispersion generally become a dry film on the material, preferably providing a somewhat even distribution of these chemical components over the surfaces of the material. The aqueous liquid (and any other liquid components present in the composition) should have disappeared as a result of evaporation, adsorption and/or other mechanisms known by those of skill in the art.

Materials to which the compositions of the invention have been applied, such as dry wall, may usually be stored indefinitely prior to use under reasonable conditions in which the materials are protected against conditions of rain, snow and like conditions.

The methods of the present invention generally result in a significant reduction in the flame spread index for a material to which a composition of the invention has been applied (the time required to reach maximum flame spread), and the amount and/or density of smoke produced by the material (and the corresponding toxic gases), when the material is subsequently exposed to flame, fire, combustion or other burning processes. Additionally, these methods generally result in a significant reduction, and often in the complete inhibition and prevention, of the growth, build-up or deposit of microbes, such as mold and mildew, on the material when the material is exposed to conditions favorable to the growth of microbes.

Test Methods for Flame Retardancy and Microbe Inhibition

Fire

The article "Standard Test Method for Surface Burning Characteristics of Building Materials," is present in the American Society for Testing and Materials' (Philadelphia, Pa.) Annual Book of ASTM Standards, and describes Test Method ASTM-E84-97a, which is known by those of skill in the art. This article defines the methods utilized to test the comparative surface burning behavior of exposed building materials, such as walls and ceilings. The flame spread, and smoke density, developed during this test are separately reported by the assignment of a pair of numerical values (one for flame spread and one for smoke density), providing the results of this test in a pair of rating numbers that show the relative performance of a tested product in terms of flame and smoke. The reported values are regarded as the standard. In most building codes, the most fire-resistant class of materials is designated as Class 1 or Class A. Class 1 or Class A fire ratings require a 1 to 25 index rating for flame spread, and a 1 to 25 index rating for smoke generation (a rating of 25 or lower in both cases). Within the Class 1 or Class A ranges of 25 or less for flame spread and smoke generation, the lower that an assigned numerical value is, the safer a tested product will generally be (it will generally be more fire-resistant and have a lower ability to produce smoke and, thus, will generally have a greater ability to reduce the loss of life and property from fires). Thus, within the ranges of 25 or less, the numerical value 1 is the best rating, the numerical value 2 is the second best rating, the numerical value 3 is the third best rating, and so forth. For example, a tested product that has a rating of 10 for flame spread, and a rating of 10 for smoke generation, should have a much lower ability to permit flame spread and smoke generation in comparison with a tested product that has a rating of 25 for flame spread, and a rating of 25 for smoke generation, and, thus, should be significantly safer during an actual fire. This test, and other fire evaluation tests, may be performed by one or more of the fire evaluation testing companies known by those of skill in the art, such as Underwriters Laboratories, Inc. (Northbrook, Ill.) or Commercial Testing Laboratories (Dalton, Ga.).

Microbes

American Society for Testing and Materials Test Methods ASTM G 21-96, ASTM D 3273-94, ASTM 3274-95 and AATCC Method 30, Part III, some of which are described in more detail hereinbelow, and which are known by those of skill in the art, define test methods, materials and equipment for measuring and reporting the levels of resistance of antimicrobial (mold, mildew, etc.) inhibition compositions when applied to various substrates. These tests, and other microbial evaluation tests, may be performed by one or more of the microbial evaluation testing companies known by those of skill in the art, such as Interface Research Corporation (Kennesaw, Ga.) and North American Science Associates, Inc. (NAMSA, Kennesaw, Ga.).

All of the materials and equipment that are used to produce the compositions of the present invention, and to carry out the methods of the present invention, and all of the equipment employed in the examples, are commercially available from sources known by those of skill in the art. Sources for these materials include Troy Chemical Corporation (Newark, N.J.), U.S. Borax, Inc. (Valencia, Calif.), Sigma Chemical Co. (St. Louis, Mo.), Aldrich Chemical Co. (Milwaukee, Wis.), Fisher Scientific (Pittsburgh, Pa.), Boehringer Mannheim (Indianapolis, Ind.), Fluka Chemical Corp. (Ronkonkoma, N.Y.), Chemical Dynamics Corp. (South Plainfield, N.J.), ARCH Chemical, Inc. (Cheshire, Conn.), Church & Dwight Co., Inc. (Princeton, N.J.), Tomah Products, Inc. (Milton, Wis.), Interface Research Corporation (Kennesaw, Ga.), Niacet Corp. (Niagara Falls, N.Y.), R.L. Lucas, Inc. (New York, N.Y.), ChemCor (Chester, N.Y.), Eka Chemicals (Marietta, Ga.), Noveon (Cleveland, Ohio), Kunal Org., Pvt., Ltd. (GB) and Berchem, Inc. (Cranston, R.I.).

Specific compositions and methods within the scope of the invention include, but are not limited to, the compositions and methods discussed in detail herein. Contemplated equivalents of the compositions and methods of the present invention include compositions and methods that otherwise correspond thereto, and that have the same general properties and/or components thereof, wherein one or more simple or other variations of components, materials, temperatures, pressures, pH, steps or like variables are made.

The following examples describe the preparation and testing of compositions within the present invention. These examples are intended to be merely illustrative of the present invention, and not limiting thereof in either scope of spirit. Those of skill in the art will readily understand that variations of certain of the conditions, materials and/or steps employed in the procedures described in the examples can be used to prepare and test these compositions.

EXAMPLE I

Preparation of a Preferred Composition of the Invention

A 500 milliliter batch of a preferred fire retardant and microbe inhibiting composition of the present invention was prepared in this example.

227.5 g of a commercial grade potassium carbonate was added to 315.6 g of de-ionized water at a pressure and temperature of 14.7 psi and 70° C., respectively. The mixture was agitated with a standard laboratory magnetic stirrer until a dispersion was achieved, which required approximately 20 minutes. 84.5 g of commercial grade potassium acetate was added to the dispersion, and the mixture was agitated until a dispersion was again achieved, which required about 10 minutes. 13 g of commercial grade boric acid was added to the dispersion, and the mixture was agitated until a dispersion was again achieved, which required about 20 minutes. 4.6 g of the microbe-inhibiting compound 3-iodo-2-propyl butyl carbamate (present in a glycol ether solvent) was added to the dispersion, and the mixture was agitated until complete miscibility was achieved, which required about 10 minutes. 4.8 g of the surfactant isodecyloxypropyl dihydroxy methyl ammonium chloride was added to the mixture, and the mixture was agitated until it was completely mixed, which took about 3 minutes.

EXAMPLE II

Preparation of Another Preferred Composition of the Invention

A 500 milliliter batch of another preferred fire retardant and microbe inhibiting composition of the present invention was prepared in this example. This composition was prepared in the same manner described in EXAMPLE I, with the exception that the microbe-inhibiting compound employed was 4.8 g of a 40% by weight strength solution of 2-pyridinethiol-1-oxide, sodium salt (sodium pyrithione), which was soluble in the alkaline composition.

Because the resulting composition was in the form of a solution, rather than a dispersion, it was not necessary or desirable to mix or agitate the composition prior to applying it to a material.

EXAMPLE III

Surface Dispersion Testing of Gypsum Walt Board

In this example, the penetration capabilities of a composition of the present invention produced in accordance with EXAMPLE I hereinabove, but either containing, or not containing, a cationic surfactant was tested on commercial grade, new construction, non-coated production run Gypsum Wall Board. The composition that contained the cationic surfactant contained the cationic surfactant isodecyloxypropyl dihydroxy methyl ammonium chloride in an amount of 0.7% by weight of the composition. The composition that did not contain the cationic surfactant had additional water added thereto in order to bring the weight percent of the composition up to 100%.

One application of each of the two compositions was separately applied to both the front side and the back side of different 3"×4" test specimens of the Gypsum Wall Board at three different application rates: (a) one application at the rate of 1 gallon per 300 square feet of Gypsum Wall Board; (b) one application at the rate of 1 gallon per 500 feet of Gypsum Wall Board; and (c) one application at a rate of 1 gallon per 600 feet of Gypsum Wall Board. The compositions were applied to the Gypsum Wall Board test specimens using a small graduated pipette to dispense the compositions onto the specimens, and then spreading the compositions evenly over the test specimens using a gloved fingertip.

After the compositions were applied to the various test specimens of the Gypsum Wall Board at the three different application rates described above, the dispersion characteristics of the various test specimens were observed for approximately 10 minutes. Dispersion of the composition into the test specimen was considered to have occurred when the surface of the test specimen no longer appeared to be wetted, but felt damp to the touch.

It was determined that, for each of the three different application rates tested, the cationic surfactant allowed the composition of the invention to be absorbed, and to disperse within, the paper binding present on the Gypsum Wall Board within about 3 to 5 minutes. In contrast, the time that it took for the composition of the invention that did not contain any surfactant to be absorbed, for each of the three different application rates tested, was about 10 minutes. Dispersion or wetting of the paper binding present on the Gypsum Wall Board specimens was determined to be diminished when the surfactant was not utilized.

EXAMPLE IV

Testing of Flame Spread on Gypsum Wall Board

The article "Standard Test Method for Surface Burning Characteristics of Building Materials" describes Test Method ASTM E-84-97a, a test for determining the relative burning behavior of a material, such as a sheet-type wall covering or coating, by observing the flame spread along a specimen of the material. Flame spread and smoke developed indexes may both be reported. This test is applicable to exposed surfaces, such as walls and ceilings, and is conducted with a specimen of a material to be tested in the ceiling position, with the surface of the material to be evaluated exposed face down towards an ignition source. The "flame spread index" is a number indicating a comparative measure derived from observations made during the progress of the boundary of a zone of flame under defined test conditions, with higher values associated with poorer results. The "surface flame spread" is the propagation of a flame away from the source of ignition across the surface of the specimen.

In this example, Commercial Testing Laboratories (Dalton, Ga.) performed a simulated Test Method ASTM E-84-97a test protocol fire test on 2'×8' test samples of commercial grade, new construction non-coated production run Gypsum Wall Board, and on 2'×8' test samples of Gypsum Wall Board that had five coats of Behr Premium Plus Latex white paint present thereon (on the front or finish side), to simulate the measured flow, ten-minute duration, natural gas flame utilized by independent testing laboratories. The front (finish or exposed) side of Gypsum Wall Board samples within each of these two groups was either treated with the composition of the invention produced in accordance with EXAMPLE I hereinabove, or was left untreated (not treated with a composition of the invention or in any other manner).

The treated test samples of Gypsum Wall Board were prepared by applying one application of the composition of the invention produced in accordance with EXAMPLE I at the rate of 1 gallon per 500 square feet of Gypsum Wall Board to the front side of 2'×8' sections of the Gypsum Wall Board (either unpainted or containing 5 coats of paint). 50-milliliter portions of the composition were poured onto the Gypsum Wall Board samples, and then a standard paint roller was employed to spread the composition evenly over the surface of the Gypsum Wall Board samples. The composition was determined to adsorb on the test sample within about 3 to 5 minutes. All test samples were placed into storage overnight, and then transported to Commercial Testing Laboratories the next day.

The results of this testing in terms of "flame spread index," and in terms of the amount of time that it took to achieve the maximum surface flame spread over the test samples, for new construction (unpainted), untreated and new construction (unpainted), treated test samples of Gypsum Wall Board are set forth below, and are indicated as tests (A) and (B). The results of tests (A) and (B) show that a significantly higher flame spread index (almost two times higher) was reported for new construction (unpainted) samples of Gypsum Wall Board that were not treated in comparison with the new construction (unpainted) samples of Gypsum Wall Board that were treated with the composition of the invention produced in accordance with EXAMPLE I. The results of tests (A) and (B) also show that the amount of time that it took for the new construction (unpainted) samples of Gypsum Wall Board that were not treated to reach a maximum surface flame spread was significantly less (about one fourth of the time) than the time that it took for the new construction (unpainted) samples of Gypsum Wall Board that were treated with the composition of the invention produced in accordance with EXAMPLE I to reach a maximum surface flame spread.

The results of this testing in terms of observations that were made in connection with the deterioration of the paper encasing the surface of painted, untreated and painted, treated test samples of Gypsum Wall Board under flame conditions, and in connection with the extent of the formation of carbon-char on these test samples during combustion, are also set forth below, and are indicated as tests (C) and (D). The flame spread index, and the amount of time that it took to achieve the maximum surface flame spread over the test samples, were not measured in tests (C) and (D). (Tests (C) and (D) were performed for the purpose of observing the effects of the composition of the invention produced in accordance with EXAMPLE I on test samples of Gypsum Wall Board that had been repaired several times to simulate periodic refinishing of the Gypsum Wall Board for maintenance purposes.) The results of tests (C) and (D) show that the damage that was caused by the fire to the untreated, painted samples of the Gypsum Wall Board was significantly worse than the damage that was caused to painted samples of the Gypsum Wall Board that had been treated with a composition of the invention produced in accordance with EXAMPLE I.

An extensive amount of carbon-char (a beneficial result) was observed on the surfaces of all samples of Gypsum Wall Board that had been treated with the composition of the invention produced in EXAMPLE I in comparison with the surfaces of samples of Gypsum Wall Board that were not treated with this composition, which contained only insignificant amounts of carbon-char. The elevated quantities of carbon-char that were present on the treated samples of Gypsum Wall Board advantageously resulted in a reduced flammability of the wall board, a reduced amount of heat released by the wall board, a reduced flame spread and penetration over the wall board, a reduced amount of smoke generated by the wall board and a reduced amount of toxic gases produced by the wall board. Further, spalling and surface cracks resulting on the samples of Gypsum Wall Board that had been treated with the composition of the invention produced in EXAMPLE I were insignificant in comparison with spalling and surface cracks that resulted on the samples of untreated Gypsum Wall Board.

| Type of Gypsum Wall Board | Flame Spread* Index | Amount of Time to Reach Maximum Surface Flame Spread |
|---|---|---|
| (A) New Construction Untreated Gypsum Wall Board | 16.2 | 1.55 minutes |
| (B) New Construction Treated Gypsum Wall Board | 9.7 | 8.30 minutes |
| (C) 5 Coats Repainted Untreated Gypsum Wall Board | | Burned through the paper binder present on the Gypsum Wall Board, and caused structural deterioration to the Gypsum Wall Board. |
| (D) 5 Coats Repainted Treated Gypsum Wall Board | | Charred the paper binder present on the Gypsum Wall Board, but did not break through the paper binder. The paper binder did not deteriorate. |

*Within the Class 1 or Class A ranges of 25 or less for flame spread and smoke generation, the lower that an assigned numerical value is, the safer a tested product will generally be (it will generally be more fire-resistant and have a lower ability to produce smoke and, thus, will generally have a greater ability to reduce the loss of life and property from fires). Thus, within the ranges of 25 or less, the numerical value 1 is the best rating, the numerical value 2 is the second best rating, the numerical value 3 is the third best rating, and so forth.

EXAMPLE V

Evaluation of Microbial Growth on New and Painted Gypsum Wall Board Samples Under Different Conditions In this example, the antimicrobial properties of the fire retardant and microbe inhibiting composition of the invention produced in accordance with EXAMPLE I hereinabove, but either containing, or not containing, a microbe-inhibiting compound, were evaluated on samples of commercial, new construction, non-coated production run Gypsum Wall Board, or on samples of painted Gypsum Wall Board, using modifications of either Test Method ASTM D 3273-94 or Test Method ASTM G 21-96. The method of application of the compositions to the Gypsum Wall Board test samples was the same as is described hereinabove in EXAMPLE III.

(A) Evaluation of Microbial Growth on Samples of New Gypsum Wall Board Using Test Method ASTM D 3273-94

The article "Standard Test Method for Resistance to Growth of Mold on the Surface of Interior Coatings in an Environmental Chamber" is present in the American Society for Testing and Materials' Annual Book of ASTM Standards, and describes Test Method ASTM D 3273-94, which is known by those of skill in the art. This article discusses a small environmental chamber, and conditions of operation, that are used to test and evaluate in a 4-week period the relative resistance of interior paint and other coatings to surface mold fungi and mildew growth in a severe interior environment in which temperature and humidity are effectively controlled within relatively narrow specified limits. A relative humidity of 95-98% at a temperature of 90±2° F. is necessary for test panels of a material (typically at least 25 3"×4" panels that are ½" thick) to develop rapidly, and to maintain an adequate moisture level to support mold growth. The chamber provides a continuous inoculation of the surface of exposed test panels with mold spores. This test is useful in estimating the performance of coatings designed for use in interior environments that promote mold growth, and in evaluating compounds that may inhibit such growth, and the aggregate levels of their use. Test panels are rated for mold growth on a 0 to 10 rating scale using photographic standards and Test Method ASTM D 3274, which is also known by those of skill in the art, with higher ratings being associated with less mold growth. A better-rated coating nearly always performs better in actual end use.

An ASTM D 3273-94 type evaluation was performed in connection with the microbe resistant properties of the flame retardant and microbe inhibiting composition of the invention produced in accordance with EXAMPLE I hereinabove, but either containing, or not containing, a microbe-inhibiting compound, on commercial, new construction, non-coated production run 3"×4" samples of Gypsum Wall Board. In each case, only one application was made of a composition to a test sample of Gypsum Wall Board, and the following three different application rates were employed for each composition: (a) one application at the rate of 1 gallon per 300 square feet of Gypsum Wall Board; (b) one application at the rate of 1 gallon per 500 feet of Gypsum Wall Board; and (c) one application at a rate of 1 gallon per 600 feet of Gypsum Wall Board.

3"×4" test samples of commercial, new construction, non-coated production run Gypsum Wall Board treated in one of three different manners were subsequently evaluated for evidence of microbes.

For the first group of test samples, the composition produced in EXAMPLE 1 hereinabove, but produced without a microbe-inhibiting compound, was dosed with 1.0% by weight of the "Intercept®" fungistat and bacteriostat (a microbe-inhibiting compound). The composition was applied to both paper surfaces of the front (finish or exposed) side of samples of the Gypsum Wall Board. (Because no antimicrobial compound was used when the composition of the invention was produced in accordance with EXAMPLE I, additional water was added to the composition to bring the weight percent of the composition up to 100% (prior to adding 1% by weight of the Intersept® fungistat and bacteriostat).)

Test samples of the Gypsum Wall Board in a second group were treated in the same manner, but with the composition produced in EXAMPLE 1 hereinabove not containing the Intersept® fungistat and bacteriostat (or any other microbe-inhibiting compound). (Because no microbe-inhibiting compound was used when the composition of the invention was produced in accordance with EXAMPLE I, additional water was added to the composition to bring the weight percent of the composition up to 100%.).

Samples of the Gypsum Wall Board in a third group were left untreated (were not treated in any manner).

Extensive colonization by the fungus "*Aspergillus flavus*," and by several species of the fungus "*Penicillum*," was observed on the paper surfaces present on both sides of all of the test samples of the Gypsum Wall Board in the third group (the untreated samples). (Initial colonization was observed within a 7-day period of time, and the colonies continued to propagate over the 28-day evaluation period specified in test method ASTM D 3273-94.) In contrast, the paper surfaces present on both sides of all of the test samples of Gypsum Wall Board in the second group (treated with the composition of the invention not containing the Intersept® fungistat and bacteriostat) only had sparse colonization by the same species of fungus described above at the end of the 28-day evaluation period. Further, no fungal colonization was observed on the paper surfaces present on either side of any of the first group of test samples of the Gypsum Wall Board (having the composition containing 1% by weight of the Intersept® fungistat and bacteriostat applied thereon) after the 28-day evaluation period.

(B) Evaluation of Microbial Growth on Samples of Painted Gypsum Wall Board Using Test Method ASTM D 3273-94

An additional ASTM 3273-94 type test was performed to evaluate the microbe resistant properties of the flame retardant and microbe inhibiting composition of the invention produced in accordance with EXAMPLE I hereinabove, but not containing any microbe-inhibiting compound, on surfaces of 3"×4" test samples of Gypsum Wall Board painted with Behr Premium Plus Latex white paint. (Because no microbe-inhibiting compound was used when the composition of the invention was produced in accordance with EXAMPLE I, additional water was added to the composition to bring the weight percent of the composition up to 100%.) Two treatments of the composition (using the same application rate for each treatment) were applied to the enclosure interior face (front side) of Gypsum Wall Board samples that had as many as 5 coats of paint present on their surfaces at each of the three following application rates: (a) one application at the rate of 1 gallon per 300 square feet of Gypsum Wall Board; (b) one application at the rate of 1 gallon per 500 feet of Gypsum Wall Board; and (c) one application at a rate of 1 gallon per 600 feet of Gypsum Wall Board. A finish coat of paint was then applied to the surface of the Gypsum Wall Board samples.

No fungal colonization was noted on any of the test samples of the Gypsum Wall Board after the 28-day evaluation period specified in test method ASTM D 3273-94.

(C) Evaluation of Microbial Growth on Samples of New and Painted Gypsum Wall Board Using Test Method ASTM G-21-96

The article "Standard Practice for Determining Resistance of Synthetic Polymeric Materials to Fungi" is present in the American Society for Testing and Materials' Annual Book of ASTM Standards, and describes Test Method ASTM G21-96, which is also known by those of skill in the art. This article discusses a test for determining the effect of fungi on the properties of synthetic polymeric materials in the form of molded and fabricated articles, tubes, rods, sheets and films. Nutrient-salts agar is poured into suitable sterile dishes to provide a solidified agar layer being from 3 to 6 mm in depth. After the agar is solidified, test specimens are placed on the surfaces of the agar, and the surfaces of the agar (including the surfaces of the test specimens) is inoculated with a composite fungal spore suspension. The inoculated test specimens are then incubated at a temperature of from 82 to 86° F. at not less than 85% relative humidity for a period of 28 days. The test specimens are rated on a scale of 0 to 4 for observed growth of sporulating, nonsporulating or sporulating and nonsporulating fungi, with a rating of 0 indicating no growth, a rating of 1 indicating traces of growth (less than 10%), a rating of 2 indicating light growth (10% to 30%), a rating of 3 indicating medium growth (30% to 60%) and a rating of 4 indicating heavy growth (60% to complete coverage). A rating of one or less must be confirmed by microscopic observation of the test samples.

North American Science Associates, Inc. (NAMSA, Kennesaw, Ga.), a certified international commercial testing laboratory, performed Test Method ASTM G-21-96 on the following six different types of 50 mm×50 mm test specimens of Gypsum Wall Board that had been prepared according to the ASTM G-21-96 test requirements to evaluate their ability (or lack thereof) on a scale of 0 to 4 to inhibit the growth, build-up or deposit of microbes on the various samples:

(1) Positive Control Samples (New Unpainted and Untreated Samples):
   new construction, production run samples containing no coats of paint that were not treated with a composition of the invention (or in any other manner) (Table 1);
(2) New Unpainted Treated Samples:
   new construction, production run samples containing no coats of paint that were treated with the flame retardant and microbe inhibiting composition produced in accordance with EXAMPLE I (Table 2);
(3) Painted Untreated Samples:
   samples that had been painted with two coats of Behr Premium Plus Latex white paint and that were not treated with a composition of the invention (or in any other manner) (Table 3);
(4) Samples Painted with Paint Containing a Commercial Mildewcide:
   samples that had been painted with two coats of Zinsser Perma white 5-year mildew-proof paint containing an undisclosed commercial mildewcide (one that is not named on the paint can label) (Table 4);
(5) Painted Treated Samples:
   samples that had been painted with two coats of Behr Premium Plus Latex white paint, and that were treated with alternating applications of the flame retardant and microbe inhibiting composition produced in accordance with EXAMPLE I in the manner described in detail hereinbelow (Table 5); and
(6) Remediated Samples:
   samples that had been painted with two coats of Behr Premium Plus Latex white paint, that subsequently were permitted to have heavy mold growth (a rating of 4) become deposited on the top layer of paint (obtained at the end of experiment (3) above), and that were then treated with the flame retardant and microbe inhibiting composition produced in accordance with EXAMPLE I (Table 6).

For the treated, unpainted test samples of Gypsum Wall Board, one application of the composition of the invention was applied on both sides of the paper substrate binding the Gypsum Wall Board test specimens at an application rate of 1 gallon per 500 feet of Gypsum Wall Board.

For the treated, painted test samples of Gypsum Wall Board, two coats of paint were utilized, and two applications of the composition of the invention were employed, each at an application rate of 1 gallon per 500 feet of Gypsum Wall Board, in the following sequential steps over a total period of about 1 hour: (a) a first layer of the composition was applied to unpainted test samples; (b) after liquid from the first layer of the composition was no longer observed standing on the surface of the test samples, which occurred after about 10 minutes, a first coat of paint was applied to the test samples; (c) after the first coat of paint applied to the test samples no longer appeared to reflect light intensely, which occurred after about 18 minutes, a second layer of the composition was applied to the painted test samples; and (d) after liquid from the second layer of the composition was no longer observed standing on the surface of the test samples, which occurred after about 8 minutes, a second (finish) layer of paint was applied to the test samples (and permitted to dry until the test samples no longer appeared to reflect light intensely, which occurred after about 21 minutes).

In all cases, a test organism mixture containing *Aspergillus niger* (ATCC No. 9642), *Penicillium pinophilum* (ATCC No. 11797), *Chaetomium globosum* (ATCC No. 6205), *Trichoderma virens* (ATCC No. 9645) and *Aurebasidium pullulans* (ATCC No. 15233) was employed, the inoculum level was $8.0 \times 10^5$-$1.2 \times 10^6$ CFU/ml, and the incubation parameters were 28 days at 28° C.-30° C. and 85% relative humidity. Also, in all cases in which a sample was treated with a composition produced in accordance with EXAMPLE I, an application rate of 1 gallon per 500 feet of Gypsum Wall Board was employed. All procedures were conducted in conformance with good laboratory practices and ISO 17025. A 6× microscope magnification was used to confirm all observations.

The results of these experiment are set forth below in Tables 1-6, and clearly demonstrate the ability of the composition of the invention prepared in accordance with EXAMPLE I to completely inhibit the growth, build-up or deposit of microbes on various samples (unpainted, painted and remediated) of Gypsum Wall Board.

TABLE 1

Positive Control Samples (New Unpainted and Untreated Samples)

| | Observed Growth on Specimens | | |
|---|---|---|---|
| Sample Identification | Replicate 1 | Replicate 2 | Replicate 3 |
| Positive Control Samples | | | |
| 7 Days | 4 | 4 | 4 |
| 14 Days | 4 | 4 | 4 |
| 21 Days* | 4 | 4 | 4 |
| 28 Days* | 4 | 4 | 4 |
| NAMSA Positive Control | 4 | 4 | 4 |

*Heavy growth (4) was observed on the sample edges on Day 21 and Day 28.

TABLE 2

New Unpainted Treated Samples

| | Observed Growth on Specimens | | |
|---|---|---|---|
| Sample Identification | Replicate 1 | Replicate 2 | Replicate 3 |
| New Unpainted Treated Samples | | | |
| 7 Days | 0 | 0 | 0 |
| 14 Days | 0 | 0 | 0 |
| 21 Days | 0 | 0 | 0 |
| 28 Days | 0 | 0 | 0 |
| NAMSA Positive Control | 4 | 4 | 4 |

TABLE 3

Painted Untreated Samples

| | Observed Growth on Specimens | | |
|---|---|---|---|
| Sample Identification | Replicate 1 | Replicate 2 | Replicate 3 |
| Painted Untreated Samples | | | |
| 7 Days | 4 | 4 | 4 |
| 14 Days | 4 | 4 | 4 |
| 21 Days* | 4 | 4 | 4 |
| 28 Days* | 4 | 4 | 4 |
| NAMSA Positive Control | 4 | 4 | 4 |

*Heavy growth (4) was observed on the sample edges at Day 21 and Day 28.

TABLE 4

Samples Painted with Paint Containing a Commercial Mildewcide

| Sample Identification | Observed Growth on Specimens | | |
|---|---|---|---|
| | Replicate 1 | Replicate 2 | Replicate 3 |
| Samples Painted with Paint Containing Commercial Mildewcide | | | |
| 7 Days | 0 | 0 | 0 |
| 14 Days | 0 | 0 | 0 |
| 21 Days* | 1 | 0 | 0 |
| 28 Days* | 1 | 1 | 0 |
| NAMSA Positive Control | 4 | 4 | 4 |

*Heavy growth (4) was observed on the sample edges on Day 21 and Day 28.

TABLE 5

Painted Treated Samples

| Sample Identification | Observed Growth on Specimens | | |
|---|---|---|---|
| | Replicate 1 | Replicate 2 | Replicate 3 |
| Painted Treated Samples | | | |
| 7 Days | 0 | 0 | 0 |
| 14 Days | 0 | 0 | 0 |
| 21 Days* | 0 | 0 | 0 |
| 28 Days* | 0 | 0 | 0 |
| NAMSA Positive Control | 4 | 4 | 4 |

*No growth (0) was observed on the sample edges on Day 21 or Day 28.

TABLE 6

Remediated Samples

| Sample Identification | Observed Growth on Specimens | | |
|---|---|---|---|
| | Replicate 1 | Replicate 2 | Replicate 3 |
| Remediated Samples | | | |
| 7 Days | 0 | 0 | 0 |
| 14 Days | 0 | 0 | 0 |
| 21 Days | 0 | 0 | 0 |
| 28 Days | 0 | 0 | 0 |
| NAMSA Positive Control | 4 | 4 | 4 |

In each of the above experiments, no mold (or other microbe) growth was observed on the surfaces or cut edges of any of the Gypsum Wall Board test samples (including samples of new, unpainted Gypsum Wall Board and samples of painted Gypsum Wall Board) that had been treated with the composition of the present invention produced in accordance with EXAMPLE I after the 28-day evaluation period specified in test method ASTM G-21-96, resulting in a zero (0) rating (the best possible rating). In sharp contrast, untreated test specimens of the Gypsum Wall Board (both painted samples and unpainted samples) generated heavy mold growth on both sides of the paper substrate binding the board (both on the surfaces and on the cut edges of the board) after the 28-day evaluation period specified in test method ASTM G-21-96, resulting in a four (4) rating (the worst possible rating).

While the present invention has been described herein with some specificity, and with reference to certain preferred embodiments thereof, those of ordinary skill in the art will recognize numerous variations, modifications and substitutions of that which has been shown which can be made, and which are within the scope and spirit of the invention, as by adding, combining or subdividing steps, or by substituting equivalents, while retaining significant advantages of the compositions and processes of the invention, which are defined in the claims that follow. It is intended, therefore, that all of these modifications, variations and substitutions be within the scope and spirit of the present invention as described and claimed herein, and that the invention be limited only by the scope of the claims which follow, and that such claims be interpreted as broadly as possible.

Throughout this application, various books, journal articles, patent applications, patents, other publications and Internet web cites have been cited. The entireties of each of these books, journal articles, patent applications, patents, other publications and information contained in the Internet web sites are hereby incorporated by reference herein in their entireties without admission that such is prior art.

What is claimed is:

1. A composition for application to a material comprising:
   (a) at least one alkaline metal inorganic salt, wherein the alkaline metal inorganic salt is present in the composition in an amount ranging from about 5% to about 45% by weight;
   (b) at least one potassium salt of an organic acid, wherein the potassium salt of an organic acid is present in the composition in an amount ranging from about 1% to about 72% by weight;
   (c) optionally, at least one boron-containing compound, wherein the boron-containing compound is present in the composition in an amount ranging from about 0% to about 10% by weight;
   (d) optionally, at least one surfactant, wherein the surfactant is present in the composition in an amount ranging from about 0% to about 5% by weight;
   (e) at least one microbe-inhibiting compound, wherein the microbe-inhibiting compound is present in the composition in an amount ranging from about 0.1% to about 6% by weight;
   (f) at least one detection component, wherein the detection component is present in the composition in an amount ranging from about 0.01% to about 3% by weight such that it permits a determination of whether or not the composition has been applied to the material; and
   (g) an aqueous liquid, wherein the aqueous liquid is present in the composition in an amount that brings the percent weight of the composition to 100%;
   wherein the composition has a pH ranging from about 7.1 to about 14, and wherein the composition, when applied to the material, reduces the amount of burning that occurs to the material, or the amount or density of smoke produced by the material, when the material is subsequently exposed to fire, and when the composition is applied to a material prior to, during or after the material being exposed to conditions favorable to the growth of microbes, reduces, inhibits or prevents the growth of microbes on the material when the material is exposed to conditions favorable to the growth of microbes.

2. The composition of claim 1 wherein the detection component is present in an amount ranging from about 0.01% to about 2% by weight.

3. The composition of claim 2 wherein the detection component is present in an amount of about 0.7%.

4. A composition for application to a material comprising:
   (a) at least one alkaline metal inorganic salt, wherein the alkaline metal inorganic salt is present in the composition in an amount ranging from about 5% to about 45% by weight;

(b) at least one potassium salt of an organic acid, wherein the potassium salt of an organic acid is present in the composition in an amount ranging from about 1% to about 72% by weight;

(c) optionally, at least one boron-containing compound, wherein the boron-containing compound is present in the composition in an amount ranging from about 0% to about 10% by weight;

(d) optionally, at least one surfactant, wherein the surfactant is present in the composition in an amount ranging from about 0% to about 5% by weight;

(e) at least one microbe-inhibiting compound, wherein the microbe-inhibiting cmpound is present in the composition in an amount ranging from about 0.1% to about 6% by weight;

(f) at least one detection component, wherein the detection component is present in the composition in an amount ranging from about 0.01% to about 10% by weight such that it permits a determination of whether or not the composition has been applied to the material; and (g) an aqueous liquid, wherein the aqueous liquid is present in the composition in an amount that brings the percent weight of the composition to 100%;

wherein the composition has a pH ranging from about 7.1 to about 14, and wherein the composition, when applied to the material, reduces the amount of burning that occurs to the material, or the amount or density of smoke produced by the material, when the material is subsequently exposed to fire, and when the composition is applied to a material prior to, during or after the material being exposed to conditions favorable to the growth of microbes, reduces, inhibits or prevents the growth of microbes on the material when the material is exposed to conditions favorable to the growth of microbes.

5. The composition of claim 4 wherein the microbe-inhibiting compound functions as the detection component.

6. The composition of claim 4 wherein the alkaline metal inorganic salt is present in an amount ranging from about 20% to about 42% by weight.

7. The composition of claim 6 wherein the potassium salt of an organic acid is present in an amount ranging from about 2% to about 60% by weight.

8. The composition of claim 7 wherein the potassium salt of an organic acid is present in an amount ranging from about 2% to about 40% by weight.

9. The composition of claim 8 wherein the potassium salt of an organic acid is present in an amount ranging from about 8% to about 15% by weight.

10. The composition of claim 9 wherein the composition contains a boron-containing compound, and wherein the boron-containing compound is present in an amount ranging from about 0.4% to about 8% by weight.

11. The composition of claim 10 wherein the composition contains a surfactant, and wherein the surfactant is present in an amount ranging from about 0.3% to about 3% by weight.

12. The composition of claim 11 wherein the microbe-inhibiting compound is present in an amount ranging from about 0.1% to about 3% by weight.

13. The composition of claim 12 wherein the detection component is present in an amount ranging from about 0.01% to about 3% by weight.

14. The composition of claim 13 wherein the boron-containing compound is present in an amount ranging from about 1% to about 6% by weight.

15. The composition of claim 14 wherein the surfactant is present in an amount ranging from about 0.5% to about 0.7% by weight.

16. The composition of claim 4 wherein the alkaline metal inorganic salt is potassium carbonate, potassium carbonate sesquihydrate, potassium gluconate, potassium citrate, potassium sorbate, potassium bromide, potassium chloride, potassium chromate, potassium fluoride, potassium iodide, potassium salicylate, potassium selinate, potassium silicate, potassium thioantimonate, potassium sulfide, potassium sulfate, potassium thiosulfate, potassium tartrate, potassium phosphate, sodium acetate, sodium carbonate, sodium formate, sodium sorbate, sodium sulfate, sodium tartrate, sodium nitrate, sodium phosphate, sodium gluconate, sodium citrate, sodium sorbate, lithium sulfate, lithium tartrate, lithium nitrate, lithium phosphate, rubidium acetate, rubidium carbonate, rubidium sulfate, cesium acetate, cesium sulfate or a combination of one or more of the foregoing.

17. The composition of claim 16 wherein the potassium salt of an organic acid is potassium acetate, potassium formate, potassium tartrate, potassium citrate, potassium sorbate, potassium lactate or potassium gluconate.

18. The composition of claim 17 wherein the composition contains a boron-containing compound, and wherein the boron-containing compound is ammonium borate, sodium borate, potassium borate, calcium borate, potassium tetraborate or potassium pentaborate.

19. The composition of claim 18 wherein the composition contains a surfactant, and wherein the surfactant is isodecyloxypropyl dihydroxy methyl ammonium chloride, cetyl trimethyl ammonium bromide, telomer B monoether, alkyl imino acid, monosodium salt, B-alanine, N-(2-carboxyethyl)-N-3 decyloxy propyl monosodium salt, Neodol 25-7, Neodol 25-9, alkyloxypolyethoxeneoxyethanol, Tergitol 15-S-7, Nonylphenol, NP-9 Ethoxalted nonylphenol or Octyphenol.

20. The composition of claim 19 wherein the microbe-inhibiting compound is 2-pyridinethiol-1-oxide, sodium salt, 3-iodo-2-propynyl butyl carbamate, disodium cyanoditholmidocarbonate, potassium N-methyldithiocarbamate, ethanol, 2,2'-(cocoimino)-bis, salt with phosphoric acid, bis (2-ethylhexyl) ester (1:1), ethanol, 2,2'-(cocoimino)-bis, salt with phosphoric acid, mono (2-ethylhexyl) ester (1:1), phosphoric acid, mono (2-ethylhexyl) ester, bis(tri-N-butylin)oxide, ortho-phenyl phenol, potassium iodide, ammonium iodide, potassium iodate, ammonium iodate, 10-10 oxybisphenoxyarsine, octadecyl.nodim.ethyltrihydroxy silypropyl ammonium chloride or 3-(trimethoxysilyl) propyloctadecyldimethyl ammonium chloride.

21. The composition of claim 20 wherein the microbe-inhibiting compound is 2-pyridinethiol-1-oxide, sodium salt.

22. The composition of claim 20 wherein the detection component is 3-iodo-2-propynyl butyl carbamate, zirconia, selenium dioxide, zirconium acetate or a boron-containing compound.

23. The composition of claim 22 wherein the alkaline metal inorganic salt is potassium carbonate.

24. The composition of claim 23 wherein the potassium salt of an organic acid is potassium acetate.

25. The composition of claim 24 wherein the boron-containing compound is potassium tetraborate or potassium pentaborate.

26. The composition of claim 25 wherein the surfactant is isodecyloxypropyl dihydroxy methyl ammonium chloride.

27. The composition of claim 26 wherein the detection component is 3-iodo-2-propynyl butyl carbamate or a boron-containing compound.

28. The composition of claim 27 wherein the microbe-inhibiting compound is 3-iodo-2-propynyl butyl carbamate, and the 3-iodo-2-propynyl butyl carbamate also functions as the detection component.

29. The composition of claim 28 wherein the pH of the composition is about 11 or higher.

30. The composition of claim 17 wherein the boron-containing compound is potassium metaborate.

31. The composition of claim 8 wherein the detection component is 3-iodo-2-propynyl butyl carbamate, zirconia, selenium dioxide, zirconium acetate or a boron-containing compound.

32. The composition of claim 31 wherein the detection component is 3-iodo-2-propynyl butyl carbamate or a boron-containing compound.

33. The composition of claim 4 wherein the alkaline metal inorganic salt is potassium bicarbonate.

34. A composition for application to a material comprising:
(a) potassium carbonate in an amount of about 25% by weight;
(b) potassium acetate in an amount of about 13% by weight;
(c) potassium tetraborate or potassium pentaborate in an amount of about 2% by weight;
(d) optionally, at least one surfactant, wherein the surfactant is present in the composition in an amount ranging from about 0% to about 5% by weight;
(e) at least one microbe-inhibiting compound, wherein the microbe-inhibiting compound is present in the composition in an amount ranging from about 0.1% to about 6% by weight;
(f) optionally, at least one detection component, wherein the detection component is present in the composition in an amount ranging from about 0% to about 10% by weight; and
(g) water, wherein the water is present in the composition in an amount that brings the percent weight of the composition to 100%;

wherein the composition has a pH of about 11 or higher, and wherein the composition, when applied to the material, reduces the amount of burning that occurs to the material, or the amount or density of smoke produced by the material, when the material is subsequently exposed to fire, and when the composition is applied to a material prior to, during or after the material being exposed to conditions favorable to the growth of microbes, reduces, inhibits or prevents the growth of microbes on the material when the material is exposed to conditions favorable to the growth of microbes.

35. The composition of claim 34 wherein the composition additionally contains isodecyloxypropyl dihydroxy methyl ammonium chloride in an amount of about 0.5% by weight, and wherein the microbe-inhibiting compound is 2-pyridinethiol-1-oxide, sodium salt in an amount ranging from about 0.4% to about 0.9% by weight.

36. The composition of claim 35 wherein the 2-pyridinethiol-1-oxide, sodium salt is present in an amount of about 0.5% by weight.

37. The composition of claim 34 wherein the composition additionally contains isodecyloxypropyl dihydroxy methyl ammonium chloride in an amount of about 0.5% by weight, and wherein the microbe-inhibiting compound is 3-iodo-2-propynyl butyl carbamate in an amount of about 0.7% by weight.

* * * * *